(12) United States Patent
Daussin et al.

(10) Patent No.: US 8,154,419 B2
(45) Date of Patent: Apr. 10, 2012

(54) OILFIELD AREA NETWORK COMMUNICATION SYSTEM AND METHOD

(75) Inventors: Rory Daussin, Spring, TX (US); Mark Adams, Duncan, OK (US); Andy Knight, Magnolia, TX (US); Tuan Do, Missouri City, TX (US); Brett Bibby, Houston, TX (US); Matthew Oehler, Katy, TX (US)

(73) Assignee: Halliburton Energy Services Inc., Duncan, OK (US)

( * ) Notice: Subject to any disclaimer, the term of this patent is extended or adjusted under 35 U.S.C. 154(b) by 1149 days.

(21) Appl. No.: 11/956,839

(22) Filed: Dec. 14, 2007

(65) Prior Publication Data

US 2009/0153354 A1    Jun. 18, 2009

(51) Int. Cl.
*G01V 3/00* (2006.01)
(52) U.S. Cl. .................................................. 340/853.1
(58) Field of Classification Search ............... 348/853.1
See application file for complete search history.

(56) References Cited

U.S. PATENT DOCUMENTS

| | | | |
|---|---|---|---|
| 4,901,563 A | 2/1990 | Pearson | |
| 4,926,544 A | 5/1990 | Koyanagi et al. | |
| 4,986,384 A | 1/1991 | Okamoto et al. | |
| 5,211,678 A | 5/1993 | Stephenson et al. | |
| 5,272,920 A | 12/1993 | Stephenson et al. | |
| 5,287,384 A | 2/1994 | Avery et al. | |
| 5,309,351 A | 5/1994 | McCain et al. | |
| 5,319,964 A | 6/1994 | Stephenson et al. | |
| 5,346,012 A | 9/1994 | Heathman et al. | |
| 5,400,018 A | 3/1995 | Scholl et al. | |
| 5,416,906 A | 5/1995 | Mariani | |
| 5,448,479 A | 9/1995 | Kemner et al. | |
| 5,488,277 A | 1/1996 | Nishikawa et al. | |
| 5,504,482 A | 4/1996 | Schreder | |
| 5,553,492 A * | 9/1996 | Barrett et al. | 73/152.29 |
| 5,559,520 A | 9/1996 | Barzegar et al. | |
| 5,588,488 A | 12/1996 | Vijn et al. | |
| 5,612,953 A | 3/1997 | Olnowich | |
| 5,646,844 A | 7/1997 | Gudat et al. | |

(Continued)

FOREIGN PATENT DOCUMENTS

EP    1444671 B1    6/2005

(Continued)

OTHER PUBLICATIONS

Yin and Alamouti, "OFDMA: A Broadband Wireless Access Technology", Mar. 27, 2006.*

(Continued)

*Primary Examiner* — Jennifer H Gay
*Assistant Examiner* — Blake Michener
(74) *Attorney, Agent, or Firm* — John W. Wustenberg; Conley Rose, P.C.

(57) ABSTRACT

A method of conducting a well treatment service job. The method comprises assembling an oilfield communication network. The oilfield communication network comprises a plurality of mobile terminals distributed across a plurality of well sites and a plurality of base transceiver stations. Some of the mobile terminals are coupled to each other in wireless communication by the base transceiver stations. The method further comprises preparing a well for the well treatment service job, performing one or more well treatment steps, collecting one or more data parameters associated with the well treatment service job, and communicating the one or more data parameters from at least a first one of the mobile terminals via the oilfield communication network.

26 Claims, 8 Drawing Sheets

U.S. PATENT DOCUMENTS

| | | | |
|---|---|---|---|
| 5,650,928 A | 7/1997 | Hagenbuch | |
| 5,659,779 A | 8/1997 | Laird et al. | |
| 5,682,139 A | 10/1997 | Pradeep et al. | |
| 5,825,981 A | 10/1998 | Matsuda | |
| 5,848,368 A | 12/1998 | Allen et al. | |
| 5,850,341 A | 12/1998 | Fournier et al. | |
| 5,864,772 A | 1/1999 | Alvarado et al. | |
| 5,913,364 A | 6/1999 | Sweatman | |
| 5,936,539 A | 8/1999 | Fuchs | |
| 5,959,547 A | 9/1999 | Tubel et al. | |
| 5,963,508 A * | 10/1999 | Withers | 367/38 |
| 5,995,888 A | 11/1999 | Hagenbuch | |
| 6,018,659 A | 1/2000 | Ayyagari et al. | |
| 6,148,196 A | 11/2000 | Baumann | |
| 6,167,967 B1 | 1/2001 | Sweatman | |
| 6,246,320 B1 | 6/2001 | Monroe | |
| 6,256,594 B1 | 7/2001 | Yamamoto et al. | |
| 6,258,757 B1 | 7/2001 | Sweatman et al. | |
| 6,266,577 B1 | 7/2001 | Popp et al. | |
| 6,351,697 B1 | 2/2002 | Baker | |
| 6,356,205 B1 * | 3/2002 | Salvo et al. | 340/853.3 |
| 6,356,822 B1 | 3/2002 | Diaz et al. | |
| 6,437,692 B1 | 8/2002 | Petite et al. | |
| 6,519,568 B1 | 2/2003 | Harvey et al. | |
| 6,611,740 B2 | 8/2003 | Lowrey et al. | |
| 6,677,861 B1 * | 1/2004 | Henry et al. | 340/855.3 |
| 6,718,263 B1 | 4/2004 | Glass et al. | |
| 6,728,514 B2 * | 4/2004 | Bandeira et al. | 455/13.1 |
| 6,745,153 B2 | 6/2004 | White et al. | |
| 6,751,444 B1 * | 6/2004 | Meiyappan | 455/69 |
| 6,751,452 B1 | 6/2004 | Kupczyk et al. | |
| 6,778,097 B1 | 8/2004 | Kajita et al. | |
| 6,967,589 B1 | 11/2005 | Peters | |
| 6,978,211 B2 | 12/2005 | Soliman et al. | |
| 6,985,750 B1 | 1/2006 | Vicknair et al. | |
| 7,066,284 B2 | 6/2006 | Wylie et al. | |
| 7,366,769 B2 | 4/2008 | Kaan et al. | |
| 7,397,363 B2 | 7/2008 | Joao | |
| 7,423,550 B2 | 9/2008 | Reckmann et al. | |
| 7,832,500 B2 * | 11/2010 | Garcia et al. | 175/24 |
| 2002/0119781 A1 * | 8/2002 | Li et al. | 455/450 |
| 2002/0156558 A1 | 10/2002 | Hanson et al. | |
| 2003/0058125 A1 | 3/2003 | Ciglenec et al. | |
| 2003/0157975 A1 | 8/2003 | Kadel et al. | |
| 2003/0163233 A1 | 8/2003 | Song et al. | |
| 2003/0169824 A1 * | 9/2003 | Chayat | 375/260 |
| 2004/0001429 A1 * | 1/2004 | Ma et al. | 370/210 |
| 2004/0142696 A1 * | 7/2004 | Saunders et al. | 455/450 |
| 2004/0205280 A1 | 10/2004 | Jeansonne et al. | |
| 2005/0101268 A1 | 5/2005 | Radosta et al. | |
| 2005/0169229 A1 * | 8/2005 | Cho et al. | 370/344 |
| 2006/0007849 A1 * | 1/2006 | Kim et al. | 370/208 |
| 2006/0062084 A1 * | 3/2006 | Drew | 367/68 |
| 2006/0153005 A1 * | 7/2006 | Herwanger et al. | 367/38 |
| 2006/0261933 A1 | 11/2006 | Deniau et al. | |
| 2007/0005201 A1 | 1/2007 | Chenn | |
| 2007/0061155 A1 | 3/2007 | Ji et al. | |
| 2007/0258525 A1 * | 11/2007 | Jacobsen et al. | 375/260 |
| 2008/0162085 A1 | 7/2008 | Clayton et al. | |
| 2008/0231466 A1 | 9/2008 | Mazrooee et al. | |
| 2011/0120702 A1 * | 5/2011 | Craig | 166/250.1 |

FOREIGN PATENT DOCUMENTS

| | | |
|---|---|---|
| EP | 1574998 A1 | 9/2005 |
| EP | 1637695 A1 | 3/2006 |
| EP | 1653044 A2 | 5/2006 |
| GB | 2317406 A | 3/1998 |
| GB | 2353546 A | 2/2001 |
| WO | 0077621 A2 | 12/2000 |
| WO | 0077621 A3 | 12/2000 |
| WO | 0126331 A2 | 4/2001 |
| WO | 0126331 A3 | 4/2001 |
| WO | 0133868 A2 | 5/2001 |
| WO | 0133868 A3 | 5/2001 |
| WO | 2005089404 A2 | 9/2005 |
| WO | 2005089404 A3 | 9/2005 |
| WO | 2007047359 A2 | 4/2007 |
| WO | 2007047359 A3 | 4/2007 |

OTHER PUBLICATIONS

Foreign communication from a related counterpart application—International Search Report and Written Opinion, PCT/GB2008/004062, Sep. 8, 2009, 12 pages.

Memarzadeh, M., et al., "Maximizing the fidelity of log signals transmitted via digital telemetry," SPE 102819, XP-002538708, 2008, pp. 1-6, Society of Petroleum Engineers.

Asaka, S., et al., "Method for processing production progress data with error correction," IDM Technical Disclosure Bulletin, Dec. 1995, pp. 561-563, Delphion.

Bain, L. R., et al., "Database and network technologies: an integral tool for methane development," SPE 22291, 1991, pp. 23-31, Society of Petroleum Engineers.

Benbow, M. S., "A fiber optic broadband telecommunications system for the Gulf of Mexico's largest offshore complex," OTC 6680, 1991, pp. 311-316, Offshore Technology Conference.

Chaudhary, S. A., et al., "Modem transmission of data for 3-D fracture modelling," SPE 26222, 1993, pp. 51-58, Society of Petroleum Engineers.

Crow, Brian P., et al., "IEEE 802.11 Wireless local area networks," IEEE Communications Magazine, Sep. 1997, pp. 116-126, IEEE.

Dassen, Jos, "Advances in field data capturing to optimize asset team reservoir development decision process," SPE 39730, 1998, pp. 1-7, Society of Petroleum Engineers, Inc.

De La Garza, Jesus, et al., "Wireless communication and computing at the construction jobsite," Automation in Construction, 1998, vol. 7, pp. 327-347, Elsevier Science B. V.

Doganata, Y. N., et al., "Data communication system for automatic vehicle identification," IBM Technical Disclosure Bulletin, Apr. 1994, pp. 235-238, Delphion.

Duffy, John D., "A perspective on systems and controls engineering in the earth moving and construction industry," Proceedings of the American Control Conference, Jun. 1998, pp. 813-817, AACC.

Duncombe, Christopher B., "Integration of commercial routing with flood search routing," IEEE Military Communications Conference, 1998, pp. 422-425, IEEE.

Epstein, Marvin, et al., "Application of commercial wireless LAN technology to forward area mobile communication," IEEE Military Communications Conference, Oct. 1993, vol. 1, pp. 490-496, IEEE.

Foreman, R. D., "The drilling command and control system," SPE 14387, 1985, 11 pages, Society of Petroleum Engineers.

Gerla, Mario, et al., "Multicluster, mobile, multimedia radio network," Wireless Networks, 1995, vol. 1, pp. 255-265, J. C. Baltzer AG, Science Publishers.

Haas, Zygmunt J., et al., "On some challenges and design choices in ad-hoc communications," IEEE Military Communications Conference, 1998, pp. 187-192, IEEE.

Isaacs, W. R., et al., "Design and impact of a real-time drilling data center," SPE 13109, 1984, 8 pages, Society of Petroleum Engineers of AIME.

Ito, T., "Emerging technology—a portable SCADA system," Paper 97-48, 13 pages, The Petroleum Society.

Korane, Kenneth J., "Satellites spur precision mining," Machine Design, May 21, 1998, vol. 70, No. 9, pp. 68-72, ABI/INFORM Global.

McChesney, James R., "Optimization of tactical multimedia networks in the forward area," IEEE, 1997, pp. 1156-1162, IEEE.

McGinley, P. J., "Leveraging off advances in Internet technology to bring data to the expert user on-shore," SPE 56687, 1999, pp. 1-7, Society of Petroleum Engineers Inc.

Mohamed, Y., et al., "A novel resource allocation scheme for ad hoc radio local area networks," IEEE 47th Vehicular Technology Conference, May 1997, pp. 1301-1305, IEEE.

Murchie, S., et al., "Innovations in global electronic data delivery," SPE 56686, 1999, pp. 1-11, Society of Petroleum Engineers Inc.

Park, Vincent D., et al., "Applicability of the temporally-ordered routing algorithm for use in mobile tactical networks," IEEE Military Communications Conference, 1998, pp. 426-430, IEEE.

Pomalaza-Raez, Carlos, "Network management of wireless tactical networks," MILCOM 97 Proceedings, vol. 3, pp. 1553-1557, IEEE.
Royer, Elizabeth M., "A review of current routing protocols for ad hoc mobile wireless networks," IEEE Personal Communications, Apr. 1999, pp. 46-55, IEEE.
Schmaltz, S. M., "The automation of a sulphur mine," OTC 6679, 1991, pp. 305-310, Offshore Technology Conference.
Schmitzer, J. L., et al., "Work-flow automation enhances job performance and improves job-execution data," SPE Computer Applications, Dec. 1997, pp. 167-170, Society of Petroleum Engineers.
Scott, Keith, et al., "Formation and maintenance of self-organizing wireless networks," IEEE, 1998, pp. 31-35, IEEE.
Shibata, Tsutayuki, et al., "Cellular local area radio network: CELARN," IEEE, 1994, pp. 629-633, IEEE.
Stephenson, Thomas E., "ATM over satellite for the warfighter," IEEE Military Communications Conference, 1998, pp. 550-553.
Stone, William C., et al., "Automation infrastructure system for a robotic 30-ton bridge crane," Robotics 98 Proceedings of the Conference, Apr. 1998, pp. 195-201.
Stone, W., et al., "NIST research toward construction site integration and automation," Journal of Aerospace Engineering, Apr. 1999, pp. 50-57.
Thomas, R. L., et al., "The impact of fracturing fluids on conductivity and performance in low-temperature wells," SPE 18862, 1989, pp. 347-356, Society of Petroleum Engineers, Inc.
Tomlinson, H. L., et al., "Fracturing process control and automation," SPE 17315, 1986, pp. 371-378, Society of Petroleum Engineers.
Van Domelen, M. L., et al., "Onsite design, analysis, and automation maximizes efficiency of fracturing operations," SPE 18863, 1989, pp. 357-363, Society of Petroleum Engineers, Inc.
Veenkant, R., et al., "Satellite communications change drilling operations and procedures," SPE 14072, 1986, pp. 525-533, Society of Petroleum Engineers.
Walker, Jeffrey, "Construction vehicle navigation and automation," Construction Productivity Advancement Research (CPAR) Program, Aug. 1996, 54 pages, U.S. Army Corps of Engineers.
Wu, C. W., et al., "AMRIS: a multicast protocol for ad hoc wireless networks," IEEE, 1999, pp. 25-29, IEEE.
Close, D. A., et al., "New information systems promise the benefits of the Information Age to the drilling industry," IADC/SPE 39331, 1998, pp. 337-349, IADC/SPE Drilling Conference.
Ganz, Aura, et al., "Robust superpoll protocol for IEEE 802.11 wireless LANs," 1998, IEEE Military Communications Conference, vol. 3, pp. 570-574, IEEE.
Hendrickson, Richard, "Globalstar for the military," 1998, pp. 808-813, IEEE.
Newman, N. P., et al., "Joint adaptive communications system (JACS) concept validation study," RL-TR-97-37, Final Technical Report, Jul. 1997, 61 pages, Rome Laboratory.
Patent application entitled "System and method for remote wellbore servicing operations," by Donald A. Belcher, et al., filed May 7, 2010 as U.S. Appl. No. 12/775,800.
Future Combat Systems (Brigade Combat Team)(FCS(BCT)), Govt. 07-7028, Mar. 14, 2007, 16 pgs.
Foreign Communication from a related counterpart application—International Preliminary Report on Patentability, PCT/GB2008/004062, Jun. 24, 2010, 8 pages.
Foreign communication from a related counterpart application, International Search Report and Written Opinion, PCT/GB2011/000632, Aug. 29, 2011, 9 pages.
Honeywell brochure entitled "Smart distributed system," http://content.honeywell.com/sensing/prodinfo/sds/, Apr. 26, 2006, 1 page.
Office Action dated Jul. 23, 2010 (20 pages), U.S. Appl. No. 11/688,095, filed Mar. 19, 2007.
Office Action (Final) dated Dec. 23, 2010 (25 pages), U.S. Appl. No. 11/688,095, filed Mar. 19, 2007.
Patent application entitled "Method for monitoring and controlling wellbore service equipment on a mobile LAN network," by Ronald Edward Dant, et al., filed Sep. 20, 2004 as U.S. Appl. No. 10/945,216.
Tyson, Jeff, et al., "How PCI works," HowStuffWorks, http://computer.howstuffworks.com/pci.htm/printable, Aug. 7, 2006, 8 pages.

* cited by examiner

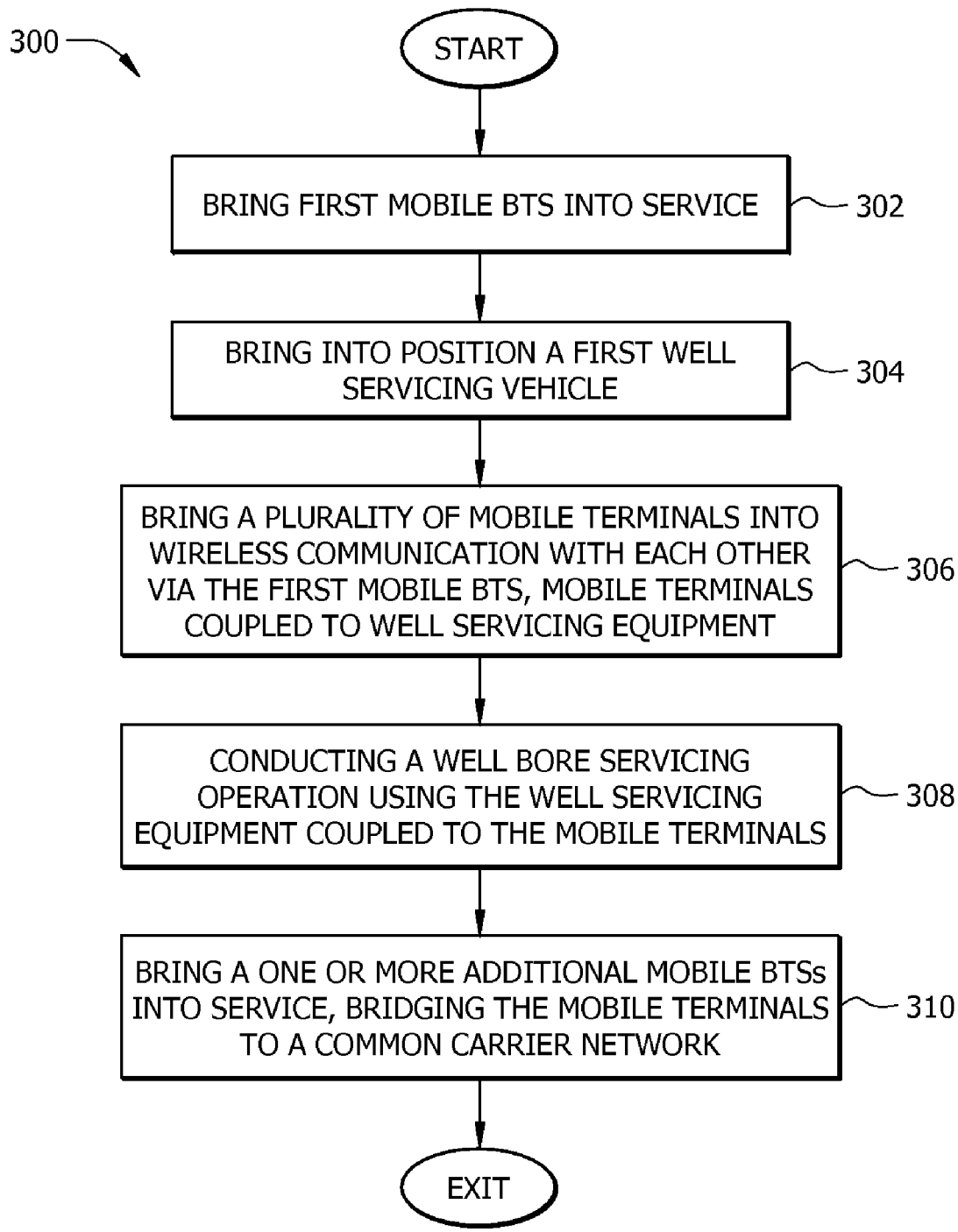

OILFIELD AREA NETWORK COMMUNICATION SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Oilfield service operations may be performed at or in proximity to a well bore at remote locations. These service operations can include, but are not limited to, logging the well bore and/or the lithology of the formations surrounding the well bore, inserting a well bore casing, cementing the well bore casing in the well bore, perforating the well bore casing, treatment of one or more reservoirs proximate the well bore, hydraulic fracturing of one or more reservoirs proximate the well bore, steam injection into one or more reservoirs proximate the well bore, and other servicing operations. Some service operations may be performed shortly after completing the initial drilling and casing of the well bore. Other service operations may be performed substantially later, as for example some well stimulation operations may be performed after a well has been producing oil and/or gas for a period of time and production from the well has slowed down enough to make the stimulation operation prudent to restore production volumes. Providing oilfield services may involve time sensitive control and coordination of skilled and unskilled personnel, vehicles, complicated tools and/or machinery, sensors, materials, and compositions of materials. Communication technologies play a central role in successful completion of oilfield service operations. As the complexity and sophistication of oilfield tools and technologies increase, the need for improved communication technologies for oilfield operations also increases.

Oil and gas wells are often remotely located, and telecommunications infrastructure may be limited in such remote locations. For example, wired access to a communications network, such as twisted pair subscriber lines and/or cable lines, may not be provided at these remote locations. Similarly, mobile or fixed cellular wireless access may not be provided at these remote locations. Additionally, in some developing countries where oilfield operations are conducted telecommunications infrastructure may be limited and/or unreliable. Some wireless local area network (WLAN) embodiments are known in the oilfield and provide advantages associated with avoiding the burden and hazards of wiring equipment together.

Satellite enabled communications can link remote locations to offices that are connected to public communications infrastructure. However, reliable, broadband wireless communication over an extended well site and among a plurality of well sites that may include transmitting high bit rate sensor data from sensors offset from the well bore by several hundreds or thousands of meters may not be satisfied by known WLAN and satellite communications solutions. Satellite communications may be subject to excessive latency or propagation delay associated with the distance a transmission travels across the several satellite links from transmitter to receiver. For example, to propagate real-time data from a first well site to a second well site in the oilfield may involve the data traversing a first up link from the first well site to the satellite, traversing a first down link from the satellite to an oilfield service company corporate office or regional office, traversing a second up link from the office to the satellite, and traversing a second down link from the satellite to the second well site—four one-way trips to/from a satellite positioned, for example, about 38,400 kilometers above the earth in geosynchronous orbit. Satellite communication is subject to various reliability problems including rain fade (attenuation or failure of signal strength due to precipitation in one of the satellite link paths) and radio interference from solar flares. WLAN communications solutions may not support both the transmission rates and the distance requirements contemplated for present and future oilfield communications. Additionally, known WLAN and satellite communications solutions may not provide broadband wireless communications between separate well sites in a remote area, which may be advantageous to leverage the value of key personnel who may be able to consult with less skilled personnel on each of multiple well sites based on richly detailed real-time data wirelessly communicated to the location of the key personnel. Thus, an ongoing need exists for improved oilfield area network communication systems and methods of using same to service a wellbore.

SUMMARY

Disclosed herein is a method of conducting a well treatment service job, comprising assembling an oilfield communication network comprising a plurality of mobile terminals distributed across a plurality of well sites and a plurality of base transceiver stations, wherein some of the mobile terminals are coupled to each other in wireless communication by the base transceiver stations; preparing a well for the well treatment service job; performing one or more well treatment steps; collecting one or more data parameters associated with the well treatment service job; and communicating the one or more data parameters from at least a first one of the mobile terminals via the oilfield communication network. The method may further comprise adjusting a parameter associated with performing one of the well treatment steps based on at least one of the data parameters communicated via the oilfield communication network. The well treatment service job may be one of a fracturing a reservoir via the well bore, an acidation stimulation treatment of a reservoir via the well bore, a casing the well bore, a cementing the well bore, and a logging the well bore. The well treatment service job may be a hydraulic fracturing job. The method may further comprise monitoring microseisms, and some of the data parameters associated with the well treatment service may include microseism sensor data. The microseisms may be monitored at the surface, the assembling the oilfield communication network may include placing one or more microseism sensors at surface locations, and each microseism sensor may be coupled to one of the mobile terminals. The microseisms may be monitored below the surface, the assembling the oilfield communication network may include placing one or more microseism sensors in sub-surface locations, and each microseism sensor may be coupled to one of the mobile terminals. The mobile terminals may wirelessly communicate with the base transceiver stations using licensed frequency spectrum. Assembling the oilfield communication network may further comprise coupling the base transceiver stations to a public network and coupling a real-time operations center to the base transceiver stations via the public network. In an embodiment, the base transceiver stations are not coupled to the public network using satellite communications. The base transceiver stations may schedule the wireless communications of the mobile terminals and the scheduling includes allocating a first number of subcarriers to a first one of the mobile terminals and allocating a second number of subcarriers to a second one of the mobile terminals, where the first number of subcarriers is different from the second number of subcarriers. The data parameters may include at least one of a fracturing fluid volume per unit of time introduced into the well bore of the well, a pressure at which a fracturing fluid is introduced into the well bore of the well, a density of a fracturing fluid, a mix or proppant material in a fracturing fluid, a fracturing fluid composition recipe, a viscosity profile of a fracturing fluid, a bottomhole temperature of the well, a transmission temperature of servicing equipment, an engine temperature of servicing equipment, an engine manifold pressure of servicing equipment, an engine speed of servicing equipment, a fuel reserve of servicing equipment, an equipment discharge pressure, a sandscrew operation speed, and an equipment torque value. The method may further comprise wirelessly communicating one of voice, data, video, and multimedia traffic from at least one of the mobile terminals via the oilfield communication network.

Further disclosed herein is an oilfield area network, comprising a first base transceiver station (BTS) configured to be a mobile BTS and configured with an autonomous electrical power source; and a plurality of mobile terminals, wherein each mobile terminal is configured to communicate wirelessly according to orthogonal frequency division multiple access (OFDMA) with the first BTS, wherein the first BTS schedules the wireless communication of the mobile terminals, and wherein at least some of the mobile terminals transmit sensor data in real-time to the first BTS. At least some of the mobile terminals may be configured to adopt to communicate using at least two different frequency bands based on the location of the oilfield area network. The mobile terminals may communicate with the first BTS according to an IEEE-802.16 broadband wireless communications standard. The oilfield area network may further comprise a second BTS configured to wirelessly communicate with a radio access network of a common carrier and to bridge the oilfield area network to the radio access network. The second BTS may be configured to be a mobile BTS and configured with an autonomous electrical power source. The oilfield area network may further comprise a second BTS configured to communicate through a wired link with a public switched telecommunications network and to bridge the oilfield area network to the public switched telecommunications network. The second BTS may be configured to be a mobile BTS and configured with an autonomous electrical power source. The oilfield area network may further comprise a third BTS configured to be a mobile BTS and configured with an autonomous electrical power source and wirelessly coupled to the first BTS according to the IEEE-802.16 broadband wireless communication standard; and another plurality of mobile terminals wherein each of the other plurality of mobile terminals is configured to communicate wirelessly according to OFDMA with the third BTS and wherein at least some of the other mobile terminals communicate with some of the mobile terminals via the third BTS and the first BTS. At least some of the other mobile terminals may be configured to adopt to communicate using at least two different frequency spectrum allocations based on the location of the oilfield area network. The third BTS may be about 48 kilometers away from the first BTS. One of the first BTS and the third BTS may be mounted on a drilling mast or derrick. The oilfield area network may further comprise a real-time operations center associated with one or more of the other mobile terminals in communication with the third BTS. The oilfield area network may further comprise a field office associated with one or more of the other mobile terminals in communication with the third BTS. The mobile terminals may transmit one of well service parameter data and well service equipment data in real-time to the first BTS from a location at least 2000 meters away from the first BTS. The first BTS may transmit at least one of voice traffic, data traffic, video traffic, and multi-media traffic to at least one of the mobile terminals.

Further disclosed herein is a method of servicing a well bore, comprising bringing into service a first mobile BTS; bringing into position proximate the well bore a first well bore servicing vehicle; and bringing a plurality of mobile terminals into wireless communication with the first mobile BTS to promote at least one of monitoring and controlling the well bore servicing, wherein the wireless communication uses OFDMA, wherein at least a first one of the mobile terminals communicates with at least a second one of the mobile terminals through the first mobile BTS, and wherein the first mobile terminal is associated with the first well bore servicing vehicle. The first well bore servicing vehicle may be configured to promote at least one of fracturing a reservoir via the well bore, an acidation stimulation treatment of a reservoir via the well bore, casing the well bore, cementing the well bore, and logging the well bore. The method may further comprise bringing into service a second mobile BTS, wherein the second mobile BTS is coupled to the first mobile BTS; and monitoring the well bore servicing vehicle from a remote terminal in wireless communication with the second mobile BTS, wherein the wireless communication of the remote terminal with the second mobile BTS uses OFDMA. In an embodiment, the second mobile BTS is not coupled to the first mobile BTS using a satellite communication link. Bringing into service the first mobile BTS may include adjusting a height of a first antenna associated with the first mobile BTS and bringing into service the second mobile BTS may include adjusting a height of a second antenna associated with the second mobile BTS, whereby line-of-sight wireless communication between the first mobile BTS and the second mobile BTS is promoted. The method may further comprise analyzing a sensor input received by the first mobile terminal; and adjusting control parameters of the well bore servicing based on analyzing the sensor input. The sensor input may be provided by the second mobile terminal, the second mobile terminal may be associated with a microseismic sensor, and the second mobile terminal may be located at least 200 meters away from the first mobile BTS. The mobile terminals may communicate wirelessly with the first mobile BTS according to a Worldwide Interoperability for Microwave Access (WiMAX) communication protocol. At least some of the mobile terminals may communicate wireless with the first mobile BTS according to one of a 3.5 generation wireless communication technology and a 4 generation wireless communication technology. The well bore servicing vehicle may be configured to promote a hydraulic fracture service operation. The well bore servicing vehicle may be configured to promote a water fracture service operation. The well bore servicing vehicle may be configured to promote a well stimulation service operation.

Further disclosed herein is an oilfield area communication network, comprising a plurality of base transceiver stations; and a plurality of mobile terminals configured to wirelessly communicate with each other via the base transceiver stations using orthogonal frequency division multiple access wireless communication links scheduled by the base transceiver stations; wherein the content of the wireless communication is one or more of voice communication, data communication, video communication, and multi-media communication; and wherein the base transceiver stations are configured to relay a wireless communication from a first mobile terminal served by a first base transceiver station to a second base transceiver station and to relay the wireless communication to a second mobile terminal served by the second base transceiver station. The plurality of base transceiver stations may provide wireless communications services throughout substantially the full extent of a production region, thereby lighting the production region. The oilfield area communication network may further comprise a real-time operations center coupled to the oilfield area communication network via a public network, wherein the real-time operations center is operable to concurrently monitor well servicing operations at a plurality of well sites in the coverage areas of the base transceiver stations, and wherein the monitoring is promoted by data received at the real-time operations center from the at least one of the plurality of mobile terminals.

Further disclosed herein is a method of conducting a fracturing service job, comprising introducing a first fracturing fluid via a well bore into a reservoir according to a first group of parameter values; sensing microseisms associated with the reservoir; wirelessly communicating microseism data in real-time to an analysis station proximate to the well bore; determining a second group of parameter values based on the microseism data and the first group of parameter values; and introducing a second fracturing fluid via the well bore into the reservoir according to the second group of parameter values. Wirelessly communicating may be accomplished using licensed frequency spectrum. The licensed frequency spectrum may be in one of the frequency bands from about 2.5 GHz to about 2.7 GHz and from about 3.3 GHz to about 3.9 GHz. The wirelessly communicating may be conducted using scheduled transmission bursts containing the microseism data, and the scheduling may be based on wireless environmental conditions. The scheduling may be based on a plurality of channel conditions associated with orthogonal frequency division multiplex sub-carriers. The microseism data may be communicated to the analysis station at a throughput rate in the range of about 1 million bits per second to about 12 million bits per second. The microseism data may be communicated to the analysis station at a throughout rate of about 10 million bits per second. The microseisms may be sensed in the subsurface region. The microseisms may be sensed at the surface.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 4 is a flow chart of a method of conducting a well bore servicing job according to an embodiment of the disclosure.

DETAILED DESCRIPTION

Figure 1:
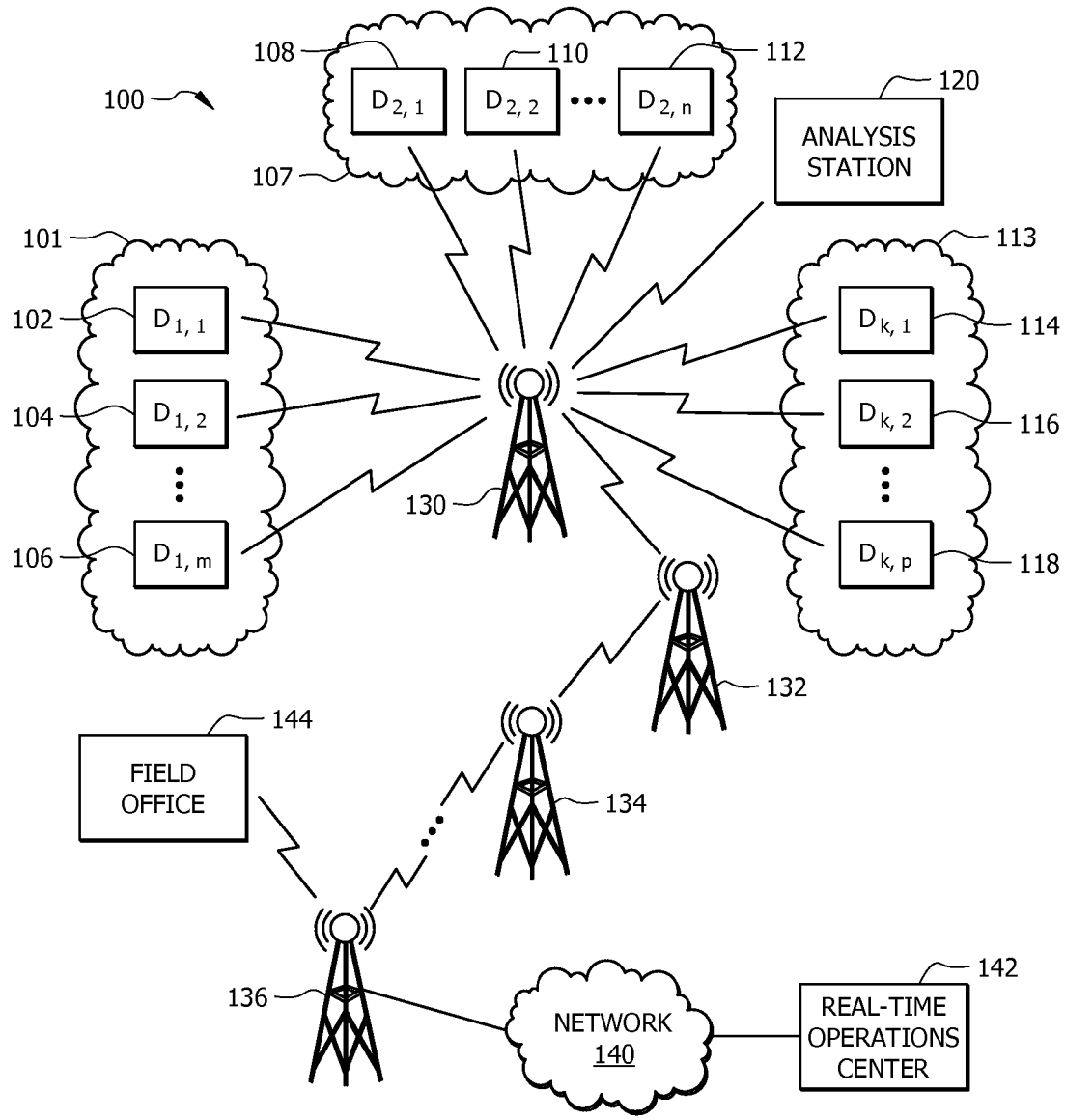
FIG. 1 is an illustration of an oilfield area network communication system according to one or more embodiments of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

An oilfield area network is disclosed herein which promotes reliable, broadband wireless communications in the oilfield, within an extended well site and among a plurality of well sites within a field or region. In an embodiment, the oilfield area network bridges remote well site communications to a common carrier communications network, for example a public switched telecommunications network, thereby linking the remote well site communications into the world wide communications network. This oilfield area network is projected to promote modern well bore servicing operations which can increase recovery of hydrocarbons from reservoirs.

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

Wellbore servicing as used herein commonly employs a variety of compositions generally termed wellbore "servicing fluids." As used herein, a "servicing fluid" refers to a fluid used to drill, complete, work over, fracture, repair, or in any way prepare a wellbore for the recovery of materials residing in a subterranean formation penetrated by the wellbore. Examples of servicing fluids include, but are not limited to cement slurries, drilling fluids or muds, spacer fluids, fracturing fluids or completion fluids, all of which are well known in the art. The servicing fluid is for use in a wellbore that penetrates a subterranean formation. It is to be understood that "subterranean formation" encompasses both areas below exposed earth and areas below earth covered by water such as ocean or fresh water.

Wellbore servicing may be conducted to achieve a variety of user-desired results. For example, wellbore servicing may be carried out to prevent the loss of aqueous or non-aqueous drilling fluids into lost circulation zones such as voids, vugular zones, and natural or induced fractures while drilling. In an embodiment, a servicing fluid is placed into a wellbore as a single stream and activated by downhole conditions to form a barrier that substantially seals lost circulation zones. In such an embodiment, the servicing fluid may be placed downhole through the drill bit forming a non-flowing, intact mass inside the lost circulation zone which plugs the zone and inhibits loss of subsequently pumped drilling fluid, allowing for further drilling. For example, the servicing fluid may form a mass that plugs the zone at elevated temperatures, such as those found at higher depths within a wellbore. Methods for introducing compositions into a wellbore to seal subterranean zones are described in U.S. Pat. Nos. 5,913,364; 6,167,967; and 6,258,757, each of which is incorporated by reference herein in its entirety.

In an embodiment, wellbore servicing may comprise well completion operations such as cementing operations. In such embodiments, a servicing fluid may be placed into an annulus of the wellbore and allowed to set such that it isolates the subterranean formation from a different portion of the wellbore. The set servicing fluid thus forms a barrier that prevents fluids in that subterranean formation from migrating into other subterranean formations. In an embodiment, the wellbore in which the servicing fluid is positioned belongs to a multilateral wellbore configuration. It is to be understood that a multilateral wellbore configuration includes at least one principal wellbore that has one or more ancillary wellbores radiating from the principle wellbore.

In an embodiment, wellbore servicing may comprise secondary cementing, often referred to as squeeze cementing. In such an embodiment, a servicing fluid may be strategically positioned in the wellbore to plug a void or crack in a conduit, to plug a void or crack in a hardened sealant (e.g., cement sheath) residing in the annulus, to plug a relatively small opening known as a microannulus between the hardened sealant and the conduit, and so forth. Various wellbore servicing procedures are described in U.S. Pat. Nos. 5,346,012 and 5,588,488, which are incorporated by reference herein in their entirety.

Turning now to FIG. 1, an oilfield area network 100 for wireless communication is discussed. The network 100 comprises a first mobile terminal 102, a second mobile terminal 104, a third mobile terminal 106, a fourth mobile terminal 108, a fifth mobile terminal 110, a sixth mobile terminal 112, a seventh mobile terminal 114, an eighth mobile terminal 116, and a ninth mobile terminal 118. The mobile terminals 102, 104, and 106 are generally located within a first area 101. The mobile terminals 108, 110, and 112 are generally located within a second area 107. The mobile terminals 114, 116, and 118 are generally located within a third area 113. In an embodiment, the network 100 comprises an optional analysis station 120. In some contexts the analysis station 120 may also be referred to as a technical command center (TCC). In an embodiment, the network 100 may comprise multiple analysis stations 120, for example an analysis station 120 in each of the areas 101, 107, 113. The network 100 also comprises a first mobile base transceiver station (BTS) 130. In an embodiment, the network 100 also comprises a second mobile BTS 132, and a third mobile BTS 134. The second mobile BTS 132 and the third mobile BTS 134 may provide wireless coverage to additional mobile terminals (not shown). In an embodiment, the network 100 also comprises a wireless common carrier BTS 136. In an embodiment, the network 100 also comprises a public network 140, for example a public switched telecommunications network.

In an embodiment, the network 100 also comprises a field office 144 and/or a real-time operations center 142. While the field office 144 is depicted in FIG. 1 as communicating with the network 100 via a wireless link, in another embodiment the field office 144 may communicate via a wired connection to the network 140 and thence to the wireless common carrier BTS 136 and thence to the first mobile BTS 130. While the real-time operations center 142 is depicted in FIG. 1 as communicating with the network 100 via a wired connection, in another embodiment the real-time operations center 142 may communicate with the network 100 via a wireless connection or via both a wired and a wireless connection.

In an embodiment, the numbers of the mobile terminals 102-118 and of the mobile BTSs 130-134 may be either greater or smaller in number. Likewise, the number of areas 101, 107, and 113, as well as the number of mobile terminals and/or BTSs therein, may be either greater or smaller in number. While it is contemplated that mobile BTSs may be useful in remote oil field operations, promoting rapid setting up and taking down of wireless infrastructure, in some embodiments fixed BTSs may be used in the place of mobile BTSs. For example, it may be considered to be more cost effective to deploy fixed BTSs in an oil field that is highly likely to remain in production and be worked and reworked over a period of several years.

The mobile terminals 102-118 and the analysis station 120 communicate with each other through wireless links provided by the first mobile BTS 130. For example, to transmit to the second mobile terminal 104, the first mobile terminal 102 transmits a first symbol on a wireless up link (also referred to as a reverse link) to the first mobile BTS 130, and the first mobile BTS 130 transmits the first symbol on a wireless down link (also referred to as a forward link) to the second mobile terminal 104. To reply to the first symbol, the second mobile terminal 104 transmits a second symbol on a wireless up link to the first mobile BTS 130, and the first mobile BTS 130 transmits the second symbol on a wireless down link to the first mobile terminal 102. The mobile terminals 102-118 and the analysis station 120 do not communicate directly with each other in a peer-to-peer arrangement In an embodiment, the first mobile BTS 130 may provide coverage to mobile terminals, for example the first mobile terminal 102, up to distances of about 16,000 meters from the first mobile BTS 130. In other embodiments, however, the first mobile BTS 130 may provide coverage to mobile terminals at greater distances, for example by transmitting at higher power levels at both the first mobile BTS 130 and at the first mobile terminal 102. In other embodiments, different coverage radii may be provided by the first mobile BTS 130, for example a coverage radius of about 1,600 meters, a coverage radius of about 8,000 meters, a coverage radius of about 24,000 meters, a coverage radius of about 32,000 meters, a coverage radius of about 40,000 meters, and a coverage radius of about 48,000 meters. As will be apparent to one skilled in the art with the aid of this disclosure, to some extent the coverage radius of a base transceiver station, for example the first mobile BTS 130, may be influenced by a variety of interrelated factors including the transmission power levels, topography of the coverage area, the number of transmitters sharing the coverage area (for example, the number of concurrently communicating mobile terminals 102-118), the state of foliage within the coverage area, the height above ground of the base transceiver station antenna, the antenna tilt, the frequency band of the wireless communication, the data transmission rate, communication modulation methods, and other factors. In an embodiment, the system 100 may provide wireless communication links supporting data rates of at least 1 mbps over distances of at least 48,000 meters.

The mobile terminals 102-118 may be coupled with a variety of devices employed in completing oilfield operations and services including sensors, electro-mechanical devices, controllers, and data processing devices. The wireless communications may be used to transmit data from a sensor to a controller and/or a data processing device, for example from a microseismic sensor to a computer executing a visualization application to depict the progress of an on-going fracture service job. The wireless communications may be used to transmit control signals from a controller to an electro-mechanical device, for example from a controller to a cement slurry mixing and/or pumping machine. The wireless communications may be used to link an electro-mechanical device on a truck or other vehicle with other mobile terminals 102-118 and/or the analysis station 120, for example to monitor and/or control the health or operational parameters of vehicle mounted equipment. The wireless communications may be used to transmit voice communications. It will readily be appreciated that the wireless communications among the mobile terminals 102-118 and the analysis station 120 may promote many other useful functions involved in completing oilfield operations and services.

It is intended that the network 100 will provide a wide variety of communication services including voice communication service, data communication service, video communication service, and multi-media communication service. From the point of view of the wireless infrastructure, the traffic carried from the first mobile terminal 102 to the ninth mobile terminal 118 may be any manner of content, voice, data, video, or multi-media. In the case where a voice communication service is used, a relatively low bandwidth subchannel, for example 6 subcarriers, may be sufficient to support high quality voice communications. In the case where a video communication service is used, a relatively high bandwidth subchannel, for example 60 subcarriers, may be sufficient to support modest quality video communications. Allocation of subcarriers based on communication service type may be managed by the BTS 130 and may be considered as an upper layer communication operation. As is well known to those skilled in the radio communication art, a subcarrier may be defined as a signal carried on a radio transmission that carries information, for example voice, data, video, and/or multimedia information. The subcarrier may be viewed as an already modulated signal which is then modulated onto another signal of higher frequency. The concept of subcarriers as used in orthogonal frequency division multiple access (OFDMA) based communication is very well known and understood to those skilled in the art, and the above definition is not intended to deviate from this widespread understanding of subcarrier that is current in the art.

In some contexts, providing the complete suite of communication services to the remote oil and gas production region—voice, data, video, and multi-media—may be referred to as "lighting the field." The interconnected communication among remote locations to achieve a unified and interrelated understanding or image of the production region reservoir, for example by sharing real-time data among a plurality of well sites, may also be referred to as "lighting the field," emphasizing the metaphor of casting light on what was previously dark and/or obscured.

The analysis station 120 is also a mobile terminal or is coupled to a mobile terminal. In an embodiment, the analysis station 120 is a general purpose computer, for example a laptop computer, a personal computer, a ruggedized computer, including a wireless interface for communicating with the first mobile BTS 130 and the mobile terminals 102-118. The analysis station 120 may be a central controller of the oilfield service operation. The analysis station 120 may be a central collection and analysis point for sensor data transmitted to the analysis station 120 by one or more of the mobile terminals 102-118. The analysis station 120 may be located in one of the areas 101, 107, or 113 or may be roving around the extended well site. An analysis station 120 may be located in more than one of the areas 101, 107, and 113 in the coverage area of the first mobile BTS 130. In an embodiment, the analysis station 120 is located close to the well bore where personnel may monitor and analyze the data received from sensors and able to operate the several equipments and machines used to conduct the well servicing operation.

The mobile terminals 102-118 may be distributed about the well site. For example, the mobile terminals 102, 104, and 106 in the first area 101 may be located relatively close to the well bore, for example within about 200 meters of the well bore. The mobile terminals 108, 110, and 112 in the second area 107 may be located relatively far from the well bore, for example about 2000 meters from the well bore. The mobile terminals in the second area may be associated with a one or more additional well bores. The mobile terminals 114, 116, and 118 in the third area 113 may be located relatively far from the well bore, for example about 2000 meters from the well bore, and opposite from the second area 107, for example about 4000 meters from the second area 107. The mobile terminals in the third area may be associated with a one or more additional well bores. Some of the mobile terminals may be located more distantly than 2,000 meters from the first mobile BTS 130.

Some of the mobile terminals 102-118 may be mobile phones, personal digital assistants (PDAs), laptop computers, personal computers, and tablet computers. An exemplary handset, which is suitable for some embodiments of the mobile terminals 102-118, is discussed in greater detail hereinafter. An exemplary general purpose computer, which is suitable for the analysis station 120 and other embodiments of the mobile terminals 102-118, is discussed in greater detail hereinafter.

The mobile BTSs 130, 132, and 134 may vary in number and may take several forms. Some oilfield services may be performed while a drilling rig derrick is in position over the well bore. In this case, the drilling rig derrick may be employed advantageously to position an antenna or an antenna array from about 30 meters to 50 meters above ground level. As is well known in the wireless communication art, increased elevation of antennas above ground level is associated with an increased wireless coverage area. Therefore, in some embodiments, one or more of the mobile BTSs 130, 132, and 134 may take the form of an antenna or antenna array mounted on a drilling rig derrick and coupled to an electronics cabinet housing standard BTS electronics including radio frequency amplifiers, up converters, down converters, digital communications processing equipment, and other BTS communications equipment well known to those skilled in the art. Electrical power may be supplied by an autonomous source of electrical power associated with the drilling rig.

In another embodiment, one or more of the mobile BTSs 130, 132, and 134 may take the form of a deployable antenna mast, a ruggedized electronic equipment cabinet housing typical BTS electronics equipment, and an autonomous electrical power source carried on an off-road truck or trailer. The truck mounted mobile BTSs 130, 132, and 134 may be driven from the regional or district yard to an appropriate point in the oilfield, for example on a rise of ground and brought into service. The mast may be composed of component parts which may be assembled at a remote site and elevated into position. The mast may be a telescoping construction which can be controllably raised to an upright position and extended to achieve an effective wireless coverage area. The truck mounted mobile BTSs 130, 132, and 134 may be positioned to form a relay of wireless links from an edge of a radio access network of a wireless common carrier, for example bridging from the common carrier BTS 136, to the first mobile BTS 130 located at or near the well bore. This bridging may be accomplished, for example, by a wireless link from the wireless common carrier BTS 136 to the third mobile BTS 134, a wireless link from the third mobile BTS 134 to the second mobile BTS 132, and a wireless link from the second mobile BTS 132 to the first mobile BTS 130. These intermediate mobile BTSs, for example the second mobile BTS 132 and the third mobile BTS 134, may be positioned at an about maximum separation distance from one another to maintain reliable wireless communications.

In an embodiment, the BTSs may be deployed in a broad area to provide wireless coverage throughout a field, for example over a radius of about 160 kilometers or over a radius of about 320 kilometers. In this embodiment links may be established between mobile terminals by relaying frames from one BTS to another BTS to another BTS until the serving BTSs associated with the two mobile terminals are linked. This provides the ability to "light the field" and provide convenient, robust, cost effective communications services in remote oil field areas. The BTSs may reserve a portion of available subcarriers for traffic relay, for example one quarter of subcarriers or one half of subcarriers. Alternatively, the BTSs may use a different frequency spectrum for BTS-to-BTS wireless links, for example a portion of an 11 GHz to 60 GHz radio spectrum.

The common carrier BTS 136 is coupled to the public network 140 by a wired connection. Through the chain of mobile BTSs, for example the second mobile BTS 132 and the third mobile BTS 134, the remote well site may be brought into communications and connected with the public network 140 for example the public data network (PDN) and/or the public switched telephone network (PSTN). In an embodiment, the field office 144 may communicate with the remote well site via the public network 140, the common carrier BTS 136, and the mobile BTSs 130, 132, and 134. In another embodiment, one of the mobile BTSs 132, 134 are coupled into the public network 140, for example in a region lacking a public wireless network. The field office 144 may communicate with the first BTS 130 and the mobile terminals 102, 104, 106, 108, 110, 112, 114, 116, and 118 and with the analysis station 120 via the second BTS 132 or through a series of linked BTSs.

Oilfield tools, for example imaging tools and well logging tools, may provide vast amounts of data in real-time which may overwhelm the earlier generation of oilfield communications systems. Oilfield technology going forwards will demand highly reliable, higher bandwidth, dynamically adjustable wireless communications. Higher volumes of data from sensors will be flowed in real-time to data processing applications to help adjust and control a wide variety of oilfield operations, particularly with reference to enhanced recovery and production stimulation operations. Higher volumes of data will be flowed in real-time between separate well sites, for example sharing microseismic data from a well site undergoing a fracturing serving job to a well site being drilled. Furthermore, a forward looking vision for the future management of oil and gas extraction proposes seeing a production district or region as an interrelated whole rather than a number of independent production wells. When viewed in this way, supported by advanced technology including the present disclosure, the concurrent and sequential stimulation of the aggregate of well bores in the region may be coordinated to achieve greater aggregate production than when oil and gas extraction is managed well-by-well in isolation. The network 100 described above provides an infrastructure to promote these aggressive communications objectives. But in addition to the hardware infrastructure, appropriate wireless link control methods, modulation techniques, and coding algorithms provide valuable direct support for these communications objectives.

The first mobile BTS 130 schedules both the up link and down link communications with the mobile terminals 102-118 and the analysis station 120. This promotes greater reliability as well as scalability. As is known in the art, a collision sense access mechanism becomes unstable when about 30% of the channel bandwidth is consumed by traffic. Collisions and retransmissions begin to flood and paralyze the channel above this level of resource allocation. On the other hand, scheduled channel allocation scales well and generally exhibits no unstable collapse of channel effectiveness. In an embodiment, the first mobile BTS 130 schedules the communication of the mobile terminals 102-118 and the analysis station 120 based on priorities that are associated with the identities of the mobile terminals 102-118 and the analysis station 120. Unlike mobile phones, which may be deemed equals in competition for access to a common carrier network, some of the mobile terminals 102-118 and/or the analysis station 120 may be deemed of higher importance than others, for example the control signals to a cement slurry blender may be accorded higher priority than a voice call from a mobile phone and/or sensor data. The first mobile BTS 130 may allocate greater channel bandwidth to higher priority mobile terminals 102-118 or to the analysis station 120.

The first mobile BTS 130 may schedule each communication frame independently. Each communication frame may comprise a plurality of symbol times, for example eight symbol times. At the beginning of a frame, the first mobile BTS 130 may transmit a variety of scheduling information and control information. Additionally, mobile terminals 102-118 and the analysis station 120 may send requests for bandwidth or subcarrier allocations at the beginning of the frame. The frame may be comprised of an up link portion during which mobile terminals 102-118 and the analysis station 120 transmit symbols to the first mobile BTS 130 and a down link portion during which the first mobile BTS 130 transmits symbols to the mobile terminals 102-118 and the analysis station 120.

The network 100 provides a wireless physical interface that employs orthogonal frequency division multiple access (OFDMA), which portions a frequency spectrum, for example an OFDMA channel, into a relatively large number of adjacent subcarriers. An OFDMA channel may be a 10 MHz frequency spectrum or some other frequency spectrum. It is contemplated that the network 100 will operate in licensed radio spectrum. In the context of the present disclosure, the term licensed radio spectrum means that local regulatory authorities have designated the subject portion of radio spectrum for a controlled and regulated communications purpose and have promulgated standards constraining the terms of radio transmission in the subject portion of radio spectrum. It is expected that the mobile terminals 102-118, the analysis station 120, and the first mobile BTS 130 will experience less radio interference as a result of communicating in licensed spectrum.

The specific frequency range allocated for OFDMA broadband wireless operation may vary from one country to another. Because the mobile terminals 102-118, the analysis station 120, and the mobile BTSs 130, 132, and 134 may operate in different oilfields in different countries, it is contemplated that at least some of the mobile terminals 102-118, the analysis station 120, and at least some of the mobile BTSs 130, 132, and 134 may be designed to comply with several different local radio transmission regulations, as for example by configuration. Alternatively, the mobile terminals 102-118, the analysis station 120, and the mobile BTSs 130, 132, and 134 may determine what regulatory region they are operating in, for example by using global positioning system (GPS) analysis or other self-location algorithms. In an embodiment, the OFDMA channel may be portioned into a number of adjacent subcarriers, for example into 128 adjacent subcarriers, 256 adjacent subcarriers, 512 adjacent subcarriers, 1024 adjacent subcarriers, or 2048 adjacent subcarriers. In other embodiments, other portioning of the frequency spectrum may be employed.

The first mobile BTS 130 allocates or schedules a subset of the subcarriers for use during a frame time by one or more of the mobile terminals 102-118 and the analysis station 120. The subcarriers allocated to one of the mobile terminals 102-118 or the analysis station 120 may be either contiguous or separated by other subcarriers. Transmitting over separated subcarriers may promote robust communications through frequency diversity. On the other hand, transmitting over contiguous subcarriers may provide other advantages, for example more accurate estimation of channel conditions. The OFDMA physical interface supports avoidance of interferers within the frequency spectrum. For example, if a known interferer effectively jams a portion of the frequency spectrum containing several adjacent subcarriers—for example subcarrier number 37, subcarrier number 38, and subcarrier number 39—the first mobile BTS 130 may delete these subcarriers from the allocation of subcarriers during scheduling. Additionally, the OFDMA physical interface supports transmitting at higher modulation rates on high quality (i.e., free from radio interference) subcarriers and transmitting at lower modulation rates on low quality subcarriers. This capability promotes both increased reliability and efficient utilization of spectrum.

Several of the subcarriers may be allocated as pilot subcarriers. The pilot subcarriers may be distributed about periodically among the subcarriers, for example about every tenth subcarrier, every fifteenth subcarrier, or every twentieth subcarrier may be allocated for use as a pilot subcarrier. In another embodiment, however, a different pilot channel allocation may be employed. One skilled in the art will be able to determine an effective pilot subcarrier allocation to achieve a balance between low overhead (associated with fewer pilot subcarriers) and improved channel quality feedback (associated with more pilot subcarriers). The first mobile BTS 130 may transmit a known signal on each of the pilot subcarriers, whereby the mobile terminals 102-118 and the analysis station 120 may calculate figures of merit of the quality of the radio channel at or about the frequency of the pilot subcarriers. The mobile terminals 102-118 and the analysis station 120 may transmit the figures of merit of the quality of the radio channel back to the first mobile BTS 130, and the first mobile BTS 130 may employ the several figures of merit to schedule allocation of the subcarriers to the mobile terminals 102-118 and the analysis station 120.

It is understood that each of the mobile terminals 102-118 and the analysis station 120 may experience channel conditions which are independent of the other mobile terminals 102-118 and the analysis station 120 and which vary considerably across the frequency spectrum. A plurality of subcarriers at the lower and higher extremes of the channel frequency spectrum may be allocated as guard subcarriers, on which transceivers do not send data or pilot signals, in order to reduce out-of-band transmissions, for example out-of-band emissions associated with minor non-linearities of radio frequency (RF) amplifiers and other radio equipment. In an embodiment, however, guard subcarriers may not be allocated for use by the mobile terminals 102-118, the analysis station 120, and for the first mobile BTS 130 because at a remote oilfield location there may be little risk that out-of-band transmissions would interfere with neighboring, unrelated RF receivers.

The radio channel may be represented or analyzed as an impulse response of a specified portion of the frequency spectrum, for example the frequency spectrum associated with a single subcarrier and/or the frequency spectrum of the entire series of subcarriers. The estimated or projected impulse response may be used to adopt and/or equalize reception of radio transmissions. In an embodiment, radio receivers in the network 100, for example radio receivers and/or radio transceivers in the mobile terminals 102-118, the analysis station 120, and the mobile BTSs 130, 132, and 134 may perform equalization functions based on their receiving a periodic training signal. The periodic training signal may be a known radio signal.

Before modulation, digital data may be encoded to introduce redundancy to increase reliability of communication. Turbo coding and block coding may be used to introduce this redundancy. In an embodiment, higher amounts of redundancy may be employed for either subcarriers experiencing poor channel conditions and/or for subcarriers carrying higher priority traffic. After coding, the digital data may be interleaved to further increase the reliability of communication. After coding and optional interleaving the digital data associated with each subcarrier is modulated using a modulation technique selected to provide the desired reliability based on the current channel conditions. It is contemplated that a variety of modulation techniques will be applied including, but not limited to, quadrature phase shift keying (QPSK), quadrature amplitude modulation (QAM), 16-QAM, 64-QAM, and 256-QAM. These different modulation techniques permit more or fewer bits to be encoded for each symbol time on a subcarrier. As is understood by those skilled in the art, a greater number of bits encoded would typically be used when channel conditions were good, and a fewer number of bits encoded would typically be used when channel conditions were poor. This flexibility promotes both efficiency and achievement of more reliable communications. In an embodiment, hybrid automatic repeat request (H-ARQ) is employed to correct errors in received data. H-ARQ involves storing errored received data, requesting a transmitter to resend the errored data, and reading the data by a process of combining the multiply transmitted data.

In an embodiment, the network 100 may implement several of the wireless physical interface provisions of the Institute of Electrical and Electronics Engineers (IEEE) 802.16 standard for broadband wireless communications. Some of the wireless techniques contemplated may also be referred to in some contexts as the worldwide interoperability for microwave access (WiMAX) technology. In other embodiments, however, portions of the network 100 may implement several of the wireless physical interface provisions of 3.5 generation (G) wireless communication systems or of 4 G wireless communication systems.

Figure 2:
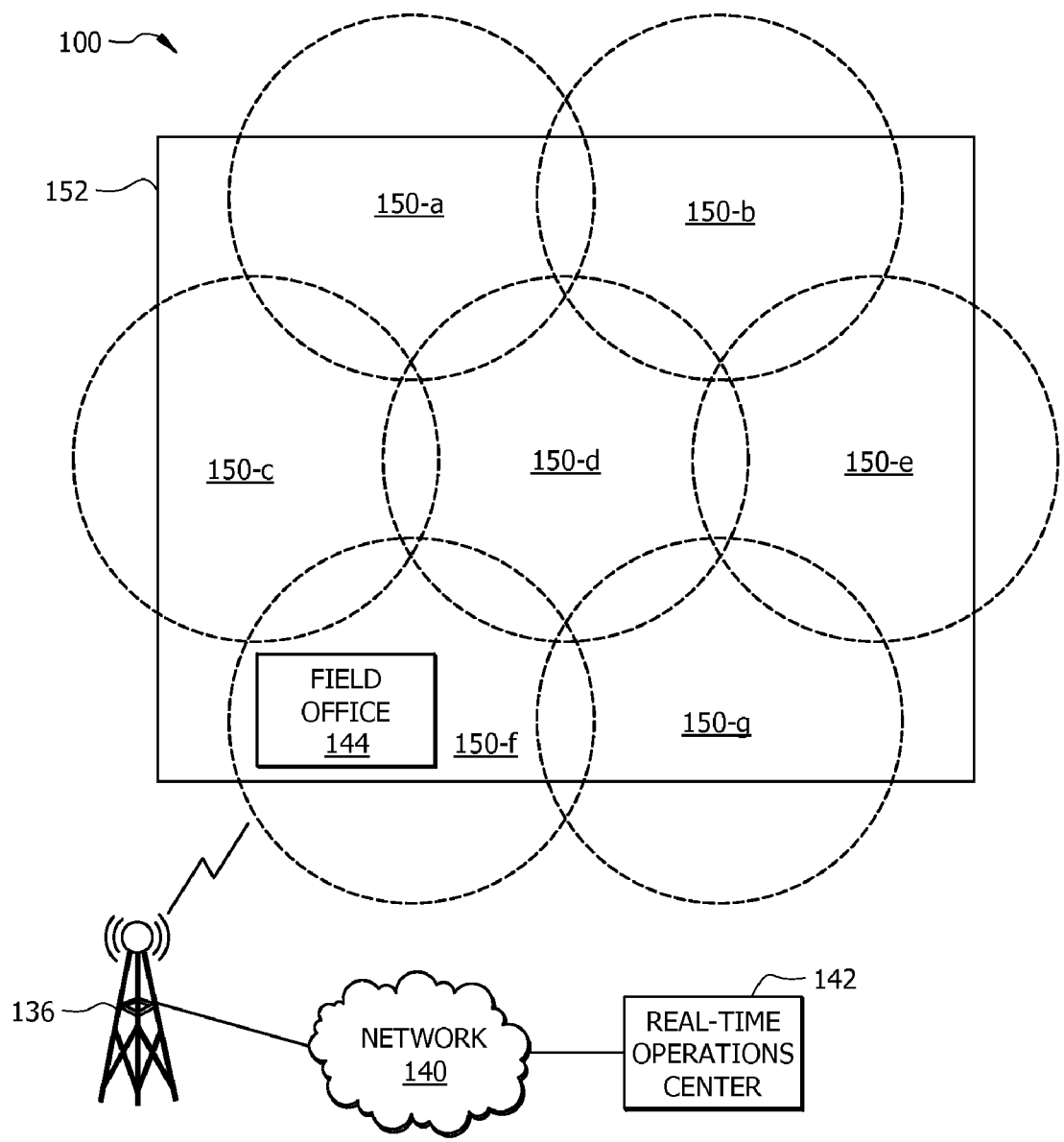
FIG. 2 is another illustration of the oilfield area network communication system according to one or more embodiments of the disclosure.

Turning now to FIG. 2, another view of the oilfield area network 100 for wireless communication is discussed. Each of the circles represent coverage areas 150—a first coverage area 150-a, a second coverage area 150-b, a third coverage area 150-c, a fourth coverage area 150-d, a fifth coverage area 150-e, a sixth coverage area 150-f, and a seventh coverage area 150-g. Each of the coverage areas 150 receives wireless communication services from a BTS, for example the first BTS 130. A well site may be co-located with the BTS at the center of some of the coverage areas 150, but some coverage areas 150 may include either zero well sites or a plurality of well sites. The size of the coverage areas 150, for example the radius of wireless service, may vary substantially from one coverage area 150 to another coverage area 150. Communication between coverage areas 150 is provided by links from BTS-to-BTS, for example from the first BTS 130 to the second BTS 132 to the third BTS 134 and so on. The network 100 may be coupled to the public network 140 by the common carrier BTS 136 or alternatively by the third BTS interworking with the public network 140 in the absence of a public radio access network. In another embodiment, however, a different coupling to the public network 140 may be provided. In yet another embodiment, the network 100 is isolated from the public network 140.

The network 100 provides communication services substantially over the whole of a production region 152. The term "production region 152" is intended herein to mean a substantially contiguous area or geo-market of oil and gas exploration, drilling, and production, which may be further defined as sharing common geological features such as production from a common formation or hydrocarbon source or reservoir. The production region 152 may include two or more contiguous or non-contiguous sub-areas. While represented in FIG. 2 as having regular shape, the production region 152 may take a variety of other irregular and asymmetrical shapes.

The field office 144 may comprise one or more field office mobile terminals (not shown) that may communicate with any mobile terminals 102-118 or analysis station 120 within the network 100. The field office 144 may be located proximate the edge of the production region, for example to have ready access to vendor services and transportation services. Alternatively, the field office 144 may be located deep within the production region. The field office 144 may provide a command center of management and business personnel, for example an operations base for a "company man" who represents a lease owner. The field office 144 may provide technology with which the "company man" may manage and direct operations at multiple locations without having to drive in a vehicle to each separate location. The field office 144 may also support well bore service company personnel monitoring the health and operational parameters of well bore service equipment in use concurrently at multiple locations. The field office 144 promotes monitoring and exercise of oversight by the coupling of computers and other tools to the field office mobile terminal. For example, a powerful laptop computer or ruggedized personal computer may include an interface card that comprises a first field office mobile terminal and the laptop computer may communicate thereby with the mobile terminals 102-118 and the analysis station 120. Alternatively, a mobile terminal in the field office 144 may act as a gateway for a plurality of computers within the field office to bridge communication from these computers into the network 100.

The real-time operations center 142 may be located remote from the production region 152, for example in an urban area or in a different production region that may be hundreds or thousands of kilometers away from the production region 152. The real-time operations center 142 may be located in a different country from the country containing the production region 152. The real-time operations center may also be located anywhere in the production region 152 or may be about centrally located within the production region. The real-time operations center 142 provides a technical control center from which engineers and other highly skilled personnel may monitor and manage on-going production operations, for example concurrent stimulation operations at well sites located throughout the production region. For example, engineers may determine whether a formation fracturing effect is growing symmetrically or asymmetrically and use their experience to make decisions to increase or decrease pumping rates and whether to continue stimulation of a well. The real-time operations center 142 may communicate with the network 100 via connectivity to the public network 140. The network 100 enables leveraging the value of the engineers and highly skilled personnel by allowing them to consult and advise on multiple concurrent well bore service operations. The network 100 provides real-time data from multiple well sites and promotes a holistic understanding and production management approach to extracting oil and gas from the production region 152 as a whole. For example, it may be possible to progressively and over time cause hydrocarbons to flow from a first edge of the production region 152, by means of cooperative stimulation service jobs at multiple well sites supported by the holistic imaging of the production region 152, to another portion of the production region 152 which is more advantageously disposed for extraction of the hydrocarbons.

The network 100 may be said to "light the field" in the sense of providing insight and visibility into the entire interrelated production region by real-time data propagation among the multiple independent well sites. Additionally, the network 100 may provide communications links from mobile terminals associated with trucks and/or service vehicles traveling within the production region 152 to the real-time operations center 142, to the field office 144, to the mobile terminals 102-118 and/or the analysis station 120. The network 100 may provide communication links to mobile terminals coupled to electro-mechanical devices mounted on trucks and/or vehicles while traveling within the production region 152 and promote monitoring health of the equipment, monitoring data associated with the state or condition of materials stored on the vehicles, and promoting software upgrade operations. The network 100 may also provide communications links from mobile terminals associated with trucks and/or service vehicles located district yards or service company yards before leaving to travel to a well site.

Figure 3A:
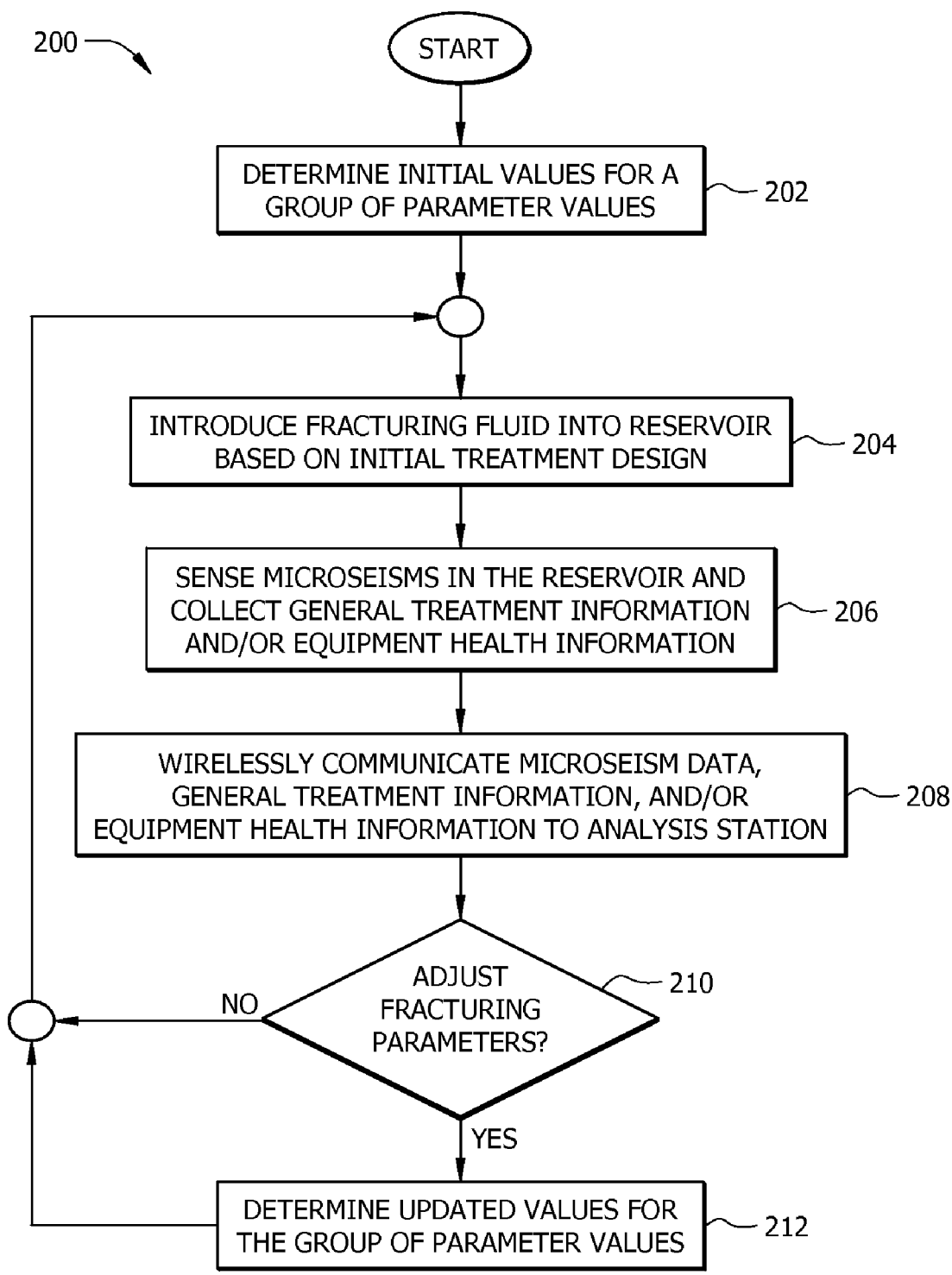
FIG. 3A is a flow chart of a method of conducting a fracturing job with microseismic fracture monitoring according to an embodiment of the disclosure.

Turning now to FIG. 3A, a method 200 of conducting a stimulation job with microseismic fracture monitoring is described. As described above, at the physical layer (PHY) the wireless traffic is just symbols or data, but at higher layers it is contemplated that the wireless traffic may comprise voice communication service, data communication service, video communication service, and/or multi-media communication service. At block 202, initial values are determined for a group of parameter values that can be used to describe or characterize the performance of the fracturing service job. These parameters may include, but are not limited to, a fracturing fluid volume per unit of time introduced into the well bore, a pressure at which the fracturing fluid is introduced into the well bore, a density of the fracturing fluid, a mix of proppant material or sand in the fracturing fluid, a fracturing fluid composition recipe including the viscosity profile of the fracturing fluid, the bottomhole temperature of the well, and other parameters known to those skilled in the art of hydrocarbon reservoir fracturing. These initial values may be determined in advance, for example at a corporate office or at a regional office, and communicated to the well site using the oilfield area network 100. Alternatively, these initial values may be determined at the well site.

At block 204, fracturing fluid is introduced into the reservoir according to the group of parameter values. It is understood that a variety of well known fracturing equipment may be employed to perform the fracturing job, for example pumping units, fracturing fluid mixing and/or conditioning units, sensors placed in bore holes to monitor microseisms, and other well known equipment.

At block 206, microseisms in the reservoir are monitored by sensors in the treatment well bore and/or in offset well bore(s). For example, sensors installed in bore hole(s) drilled an effective distance into the ground proximate to the treatment well bore. One skilled in the art will readily determine an effective distance from the well bore to locate these microseismic sensors. Microseism data may be collected from a plurality of microseism sensors located variously proximate to the well bore. In addition and concurrently to the collection of microseismic data, general stimulation data such as treating pressure, pumping rate, and proppant concentration are also collected. The stimulation data may also include downhole temperature data as may be acquired by distributed temperature sensing (DTS) operations. Equipment health data, equipment data, and/or equipment diagnostic information may also be collected. By way of example, it is useful to monitor equipment health parameters and/or equipment data such as transmission temperature, engine temperature, engine manifold pressure, fuel reserve quantity, engine speed, equipment torque, equipment discharge pressures, and sandscrew operations. Some microseismic sensors may be located relatively close to the well bore, for example about 200 meters or less away from the well bore. Other microseismic sensors may be located relatively distant from the well bore, for example about 2000 meters or further from the well bore. The sensors may be positioned at varying depths in bore holes. The sensors may generally be similar to other seismic sensors, for example geophones, but may have specialized features that promote sensing microseisms. The sensors are coupled to mobile terminals such as mobile terminals 102-118. The sensors may generate a variety of content including voice, data, video, and multimedia.

At block 208, microseismic data, treatment data, and/or equipment health data are wirelessly communicated to the analysis station 120. The analysis station 120 may be located close to the fracturing equipment, near the well bore. The sensors transmit their data wirelessly to the analysis station 120, via the first mobile BTS 130, as described above. In an embodiment, the rate of data transmitted from the first mobile BTS 130 to the analysis station 120 may be in the range of about 1 million bits per second (mbps) to about 12 mbps, preferably about at least 10 mbps. In an embodiment, the microseismic data, treatment data, and/or equipment health data may be wirelessly communicated to the real-time operations center 142, for example from the mobile terminals 102-118 to the first mobile BTS 130, from the first mobile BTS 130 to the public network 140 via the other BTSs 132, 134, and 136, and from the public network 140 to the real-time operations center 142. In an embodiment, the microseismic data, treatment data, and/or equipment health data may be wirelessly communicated to the field office 144, for example from the mobile terminals 102-118 to the first mobile BTS 130, and from the first mobile BTS 130 to the field office 144 via the other BTSs 132, 134.

At block 210, if the analysis of the sensor data, general stimulation data, or equipment health data wirelessly transmitted to the analysis station 120 and/or the real-time operations center 142 and/or the field office 144 indicates that the group of parameter values should be revised to improve the progress of the fracturing job, the method 200 proceeds to block 212. At block 212, updated values for the group of parameter values are determined and communicated to appropriate mobile terminals. In an embodiment, the analysis station 120 may automatically calculate the updated values for the group of parameter values. Alternatively, a skilled fracturing operator may determine the updated values for the group of parameter values based on their knowledge and experience. Additionally, equipment health data may indicate or predict an impending equipment failure or erroneous condition, and an operator may take steps to correct the equipment problem or halt the microseismic fracturing operation to repair or replace equipment.

The method 200 then returns to block 204. It is contemplated that the method 200 will continue to loop between block 204 and blocks 210 and 212 until the fracturing job has been completed. The wireless transmission of the microseismic data, general stimulation data, and/or equipment health data promotes making adjustments to the group of parameter values in real-time or near real-time, thereby promoting refinements in conducting fracturing jobs. The oilfield area network 100 promotes the real-time, reliable transmission of high volumes of microseismic sensor data to the analysis station 120 and/or the real-time operations center 142 and/or the field office 144. The oilfield area network 100 promotes the cooperation and collaboration of individuals having different skill levels and located either in the field or at remote locations, for example at the real-time operations center 142 that may be located in an urban area.

Figure 3B:
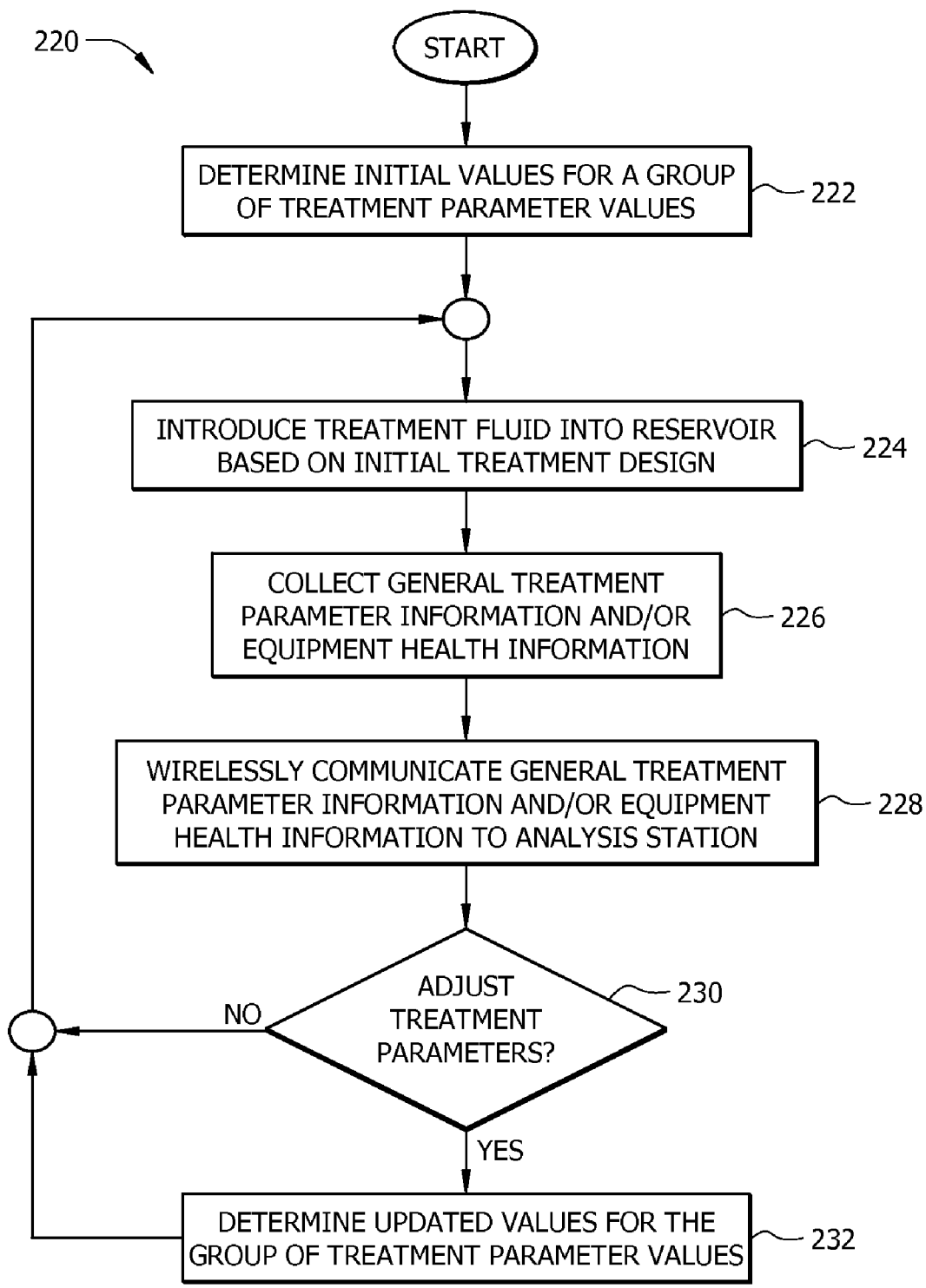
FIG. 3B is a flow chart of a method of conducting a fracturing job based on monitoring fracturing parameters and/or equipment health data according to an embodiment of the disclosure.

Turning now to FIG. 3B, a method 220 of conducting a well treatment or wellbore servicing job based on monitoring treatment parameters and/or equipment health data is described. At block 222, initial values are determined for a group of treatment parameter values that can be used to describe or characterize the performance of the well treatment service job. These treatment parameters may include, but are not limited to, a treatment fluid volume per unit of time introduced into the well bore, a pressure at which the treatment fluid is introduced into the well bore, a density of the treatment fluid, a PH of the treatment fluid, a mix of proppant material or sand in the treatment fluid, a treatment fluid composition recipe including the viscosity profile of the treatment fluid, the bottomhole temperature of the well, and other parameters known to those skilled in the art of well treatment. These initial values may be determined in advance, for example at a corporate office or at a regional office, and communicated to the well site using the oilfield area network 100. Alternatively, these initial values may be determined at the well site.

At block 224, treatment fluid is introduced into the well bore according to the group of parameter values. It is understood that a variety of well known treatment equipment may be employed to perform the treatment job, for example pumping units, fluid mixing and/or conditioning units, sensors placed in bore holes to monitor treatment parameters, sensors associated with treatment equipment, and other well known equipment.

At block 226, treatment parameters and/or equipment health parameters are monitored by sensors. For example, general stimulation and/or treatment data such as treatment fluid PH value, treatment fluid viscosity, treating pressure, treatment fluid pumping rate, and proppant concentration are also collected. The treatment data may also include downhole temperature data as may be acquired by distributed temperature sensing (DTS) operations. Equipment diagnostic information may also be collected. By way of example, it is useful to monitor equipment health parameters and/or equipment data such as transmission temperature, engine temperature, engine manifold pressure, fuel reserve quantity, engine speed, equipment torque, equipment discharge pressures, and sand-screw operations. Some sensors may be located relatively close to the well bore, for example about 200 meters or less away from the well bore. Other sensors may be located relatively distant from the well bore, for example about 2000 meters or further from the well bore. The sensors may be positioned at varying depths in bore holes. The sensors are coupled to mobile terminals such as mobile terminals 102-118. The sensors may generate a variety of content including voice, data, video, and multimedia.

At block 228, treatment data and/or equipment health data are wirelessly communicated to the analysis station 120. The analysis station 120 may be located close to the fracturing equipment, near the well bore. The sensors transmit their data wirelessly to the analysis station 120, via the first mobile BTS 130, as described above. In an embodiment, the rate of data transmitted from the first mobile BTS 130 to the analysis station 120 may be in the range of about 1 million bits per second (mbps) to about 12 mbps, preferably about at least 10 mbps. In an embodiment, the treatment data and/or equipment health data may be wirelessly communicated to the real-time operations center 142, for example from the mobile terminals 102-118 to the first mobile BTS 130, from the first mobile BTS 130 to the public network 140 via the other BTSs 132, 134, and 136, and from the public network 140 to the real-time operations center 142. In an embodiment, the treatment data and/or equipment health data may be wirelessly communicated to the field office 144, for example from the mobile terminals 102-118 to the first mobile BTS 130, and from the first mobile BTS 130 to the field office 144 via the other BTSs 132, 134.

At block 230, if the analysis of the sensor data, general stimulation and/or treatment data, or equipment health data wirelessly transmitted to the analysis station 120 and/or the real-time operations center 142 indicates that the group of parameter values should be revised to improve the progress of the treatment job, the method 220 proceeds to block 232. At block 232, updated values for the group of treatment parameter values are determined and communicated to appropriate mobile terminals. In an embodiment, the analysis station 120 may automatically calculate the update values for the group of treatment parameter values. Alternatively, a skilled treatment operator may determine the updated values for the group of treatment parameter values based on their knowledge and experience. Additionally, equipment health data may indicate or predict an impending equipment failure or erroneous condition, and an operator may take steps to correct the equipment problem or halt the treatment operation to repair or replace equipment.

The method 220 then returns to block 224. It is contemplated that the method 220 will continue to loop between block 224 and blocks 230 and 232 until the treatment job has been completed. The wireless transmission of the treatment data, general stimulation data, and/or equipment health data promotes making adjustments to the group of treatment parameter values in real-time or near real-time, thereby promoting refinements in conducting treatment jobs. The oilfield area network 100 promotes the real-time, reliable transmission of high volumes of sensor data to the analysis station 120 and/or the real-time operations center 142 and/or the field office 144. The oilfield area network 100 promotes the cooperation and collaboration of individuals having different skill levels and located either in the field or at remote locations, for example at the real-time operations center 142 that may be located in an urban area.

Turning now to FIG. 4, a method 300 for conducting a well bore service job is described. At block 302, the first mobile BTS 130 is brought into service. When a drilling rig is in place over the well bore, an antenna or antenna array may be mounted to the top of the drilling rig derrick, an electronics cabinet containing BTS electronics equipment may be set up on the ground, including connecting the electronics cabinet to an appropriate electrical power source, and a cabling run coupling the antenna or antenna array to an electronics cabinet on the ground may be installed. The antenna or antenna array and the cabling run may be installed while the drilling rig derrick is first assembled and horizontal proximate the ground, before erection of the derrick during well site set up before drilling commences. In the circumstance where the drilling rig has been removed from the well site, bringing the first mobile BTS 130 into service may involve driving a truck or trailer mounted mobile BTS to the location, erecting the antenna mast, coupling the electronics equipment cabinet to the antenna or antenna array, and coupling the electronics equipment cabinet to an appropriate source of electrical power.

At block 304, a first well servicing vehicle is brought into position at the well site. The first well servicing vehicle may be any of a variety of vehicles including a fluids carrying vehicle, a proppent carrying vehicle, a pumping vehicle, a mixing vehicle, a control center or analysis station vehicle, and other vehicles. Some or all of these vehicles may be coupled to mobile terminals 102-118.

At block 306, a plurality of mobile terminals are brought into wireless communication with each other. For example, the mobile terminals 102-118 are brought into wireless communication with each other through the mediation of the first mobile BTS 130. The mobile terminals 102-118 are coupled to various equipment and data processing equipment, for example, electro-mechanical equipment including, but not limited to, mixing and blending equipment, pumps, and flow control valves; sensors such as temperature sensors, pressure sensors, flow rate sensors, density sensors, valve position sensors, microseism sensors, and other sensors; and data processing equipment such as controllers and analysis stations.

At block 308, a well servicing operation or job is conducted using the varied equipment coupled to the mobile terminals 102-118 and other equipment. The wireless communication using the mobile terminals 102-118 is contemplated to promote real-time propagation of sensor data to promote adjustment and refinement of well servicing procedures.

At block 310, optionally one or more additional mobile BTSs 132, 134 are brought into service. The additional mobile BTSs 132, 134 may promote communication with other well sites within the oilfield area or may bridge the oilfield area network 100 back to a common carrier network.

Figure 5:
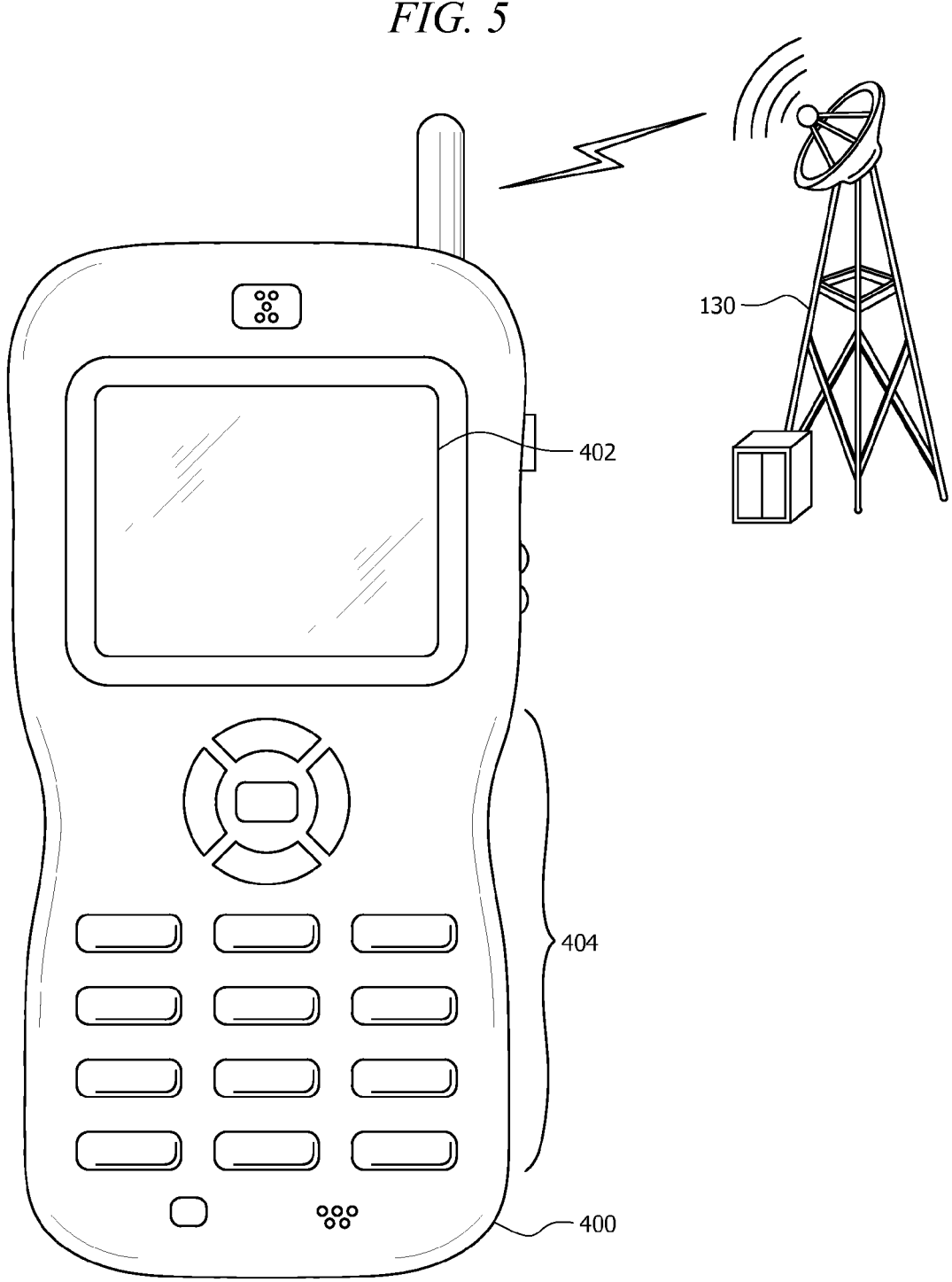
FIG. 5 is an illustration of a handset suitable for implementing some aspects of an embodiment of the disclosure.

Turning now to FIG. 5, a handset 400 is now described which is operable for implementing aspects of the present disclosure, but the present disclosure should not be limited to these implementations. Though illustrated as a mobile phone, the handset 400 may take various forms including a wireless handset, a pager, a personal digital assistant (PDA), a portable computer, a tablet computer, or a laptop computer. Many suitable handsets combine some or all of these functions. One skilled in the art will appreciate the advantages of applying components developed for the mobile devices consumer market to implement some of the mobile terminals 102-118. The handset 400 may support Internet protocol (IP) telephony, push-to-talk functionality, and various wireless communication technologies including WiMAX, GSM, CDMA, OFDMA, and others.

The handset 400 includes a display 402 and a touch-sensitive surface or keys 404 for input by a user. The handset 400 may present options for the user to select, controls for the user to actuate, and/or cursors or other indicators for the user to direct. The handset 400 may further accept data entry from the user, including numbers to dial or various parameter values for configuring the operation of the handset. The handset 400 may further execute one or more software or firmware applications in response to user commands. These applications may configure the handset 400 to perform various customized functions in response to user interaction. Additionally, the handset 400 may be programmed and/or configured over-the-air, for example from the first BTS 130.

The handset 400 may execute a web browser application which enables the display 402 to show a web page. The web page may be obtained via wireless communications with the first mobile BTS 130.

Figure 6:
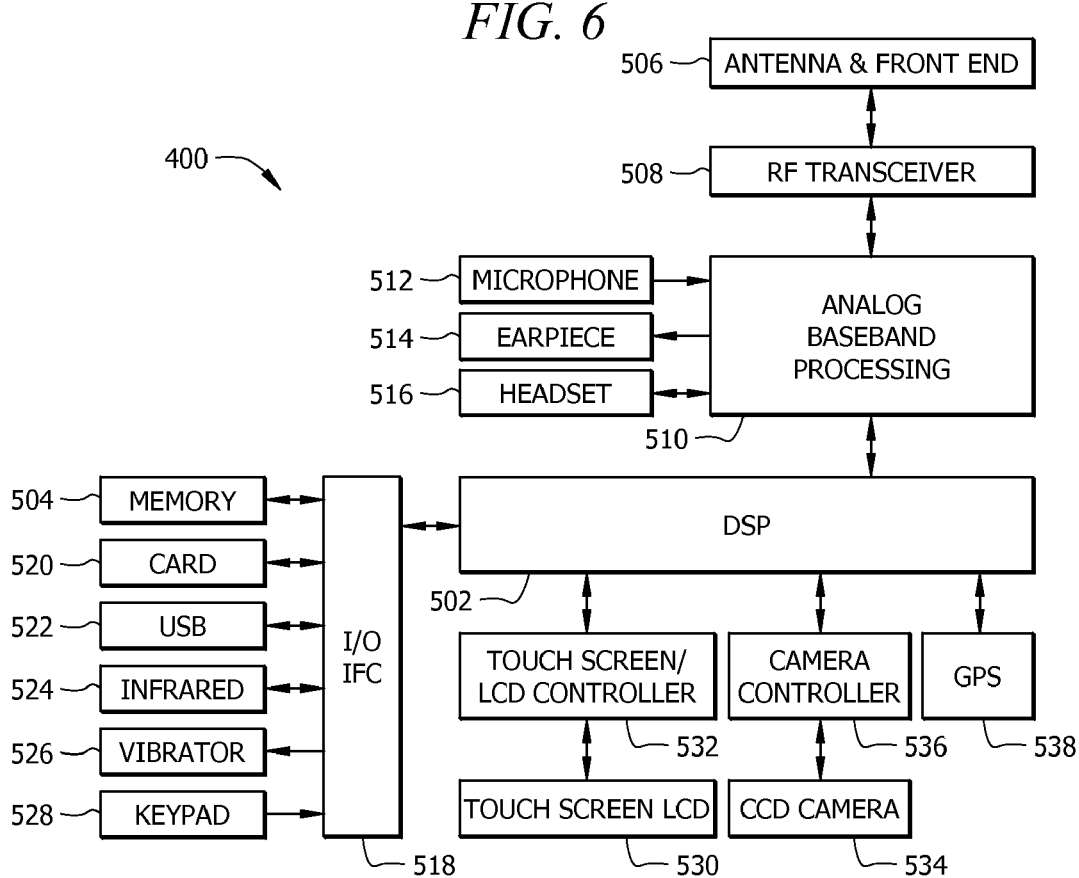
FIG. 6 is a block diagram of a handset suitable for implementing some aspects of an embodiment of the disclosure.

FIG. 6 shows a block diagram of the handset 400. While a variety of known components of handsets 102 are depicted, in an embodiment a subset of the listed components and/or additional components not listed may be included in the handset 400. The handset 400 includes a digital signal processor (DSP) 502 and a memory 504. As shown, the handset 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the handset 400 may include another kind of display that does not provide a touch sensitive screen. In an embodiment, the DSP 502 may communicate directly with the memory 504 without passing through the input/output interface 518. In an embodiment, specialized interfaces to promote control of electro-mechanical devices or to promote collection of real-time or near real-time sensor data may be substituted for some of the peripheral devices enumerated above.

The DSP 502 or some other form of controller or central processing unit operates to control the various components of the handset 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 400 to send and receive information from a cellular network or some other available wireless communications network or from a peer handset 400. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 408, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the handset 400 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, inverse fast fourier transforming (IFFT)/fast fourier transforming (FFT), cyclic prefix appending/removal, and other signal processing functions associated with wireless communications. In an embodiment, for the transmitter function the DSP 502 may perform modulation, coding, interleaving, inverse fast fourier transforming, and cyclic prefix appending, and for a receiver function the DSP 502 may perform cyclic prefix removal, fast fourier transforming, deinterleaving, decoding, and demodulation. In other wireless technology applications, yet other signal processing functions and combinations of signal processing functions may be performed by the DSP 502.

The DSP 502 may communicate with a wireless network, different from the network 100, via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the handset 400 to function as a peripheral device to exchange information with a personal computer or other computer system. The infrared port 524 may enable the handset 400 to communicate wirelessly with other nearby handsets and/or wireless base stations.

The input/output interface 518 may further connect the DSP 502 to the vibrator 526 that, when triggered, causes the handset 400 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the handset 400. Another input mechanism may be the touch screen LCD 530, which may also display text and/or graphics to the user. The touch screen LCD controller 532 couples the DSP 502 to the touch screen LCD 530.

The CCD camera 534 enables the handset 400 to take digital pictures. The DSP 502 communicates with the CCD camera 534 via the camera controller 536. The GPS sensor 538 is coupled to the DSP 502 to decode global positioning system signals, thereby enabling the handset 400 to determine its position. In another embodiment, a camera operating according to a technology other than Charge Coupled Device cameras may be employed. Various other peripherals may also be included to provide additional functions, e.g., radio and television reception.

Figure 7:
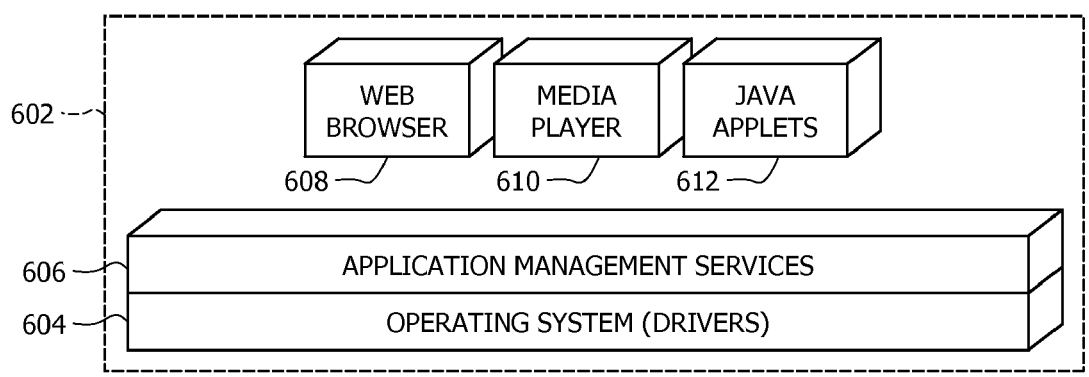
FIG. 7 is a block diagram of a handset software architecture suitable for implementing some aspects of an embodiment of the disclosure.

FIG. 7 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 400. Also shown in FIG. 7 are a web browser application 608, a media player application 610, and Java applets 612. The web browser application 608 configures the handset 400 to operate as a web browser, allowing a user to enter information into forms and select links to retrieve and view web pages. The media player application 610 configures the handset 400 to retrieve and play audio or audiovisual media. The Java applets 612 configure the handset 400 to provide games, utilities, and other functionality.

Figure 8:
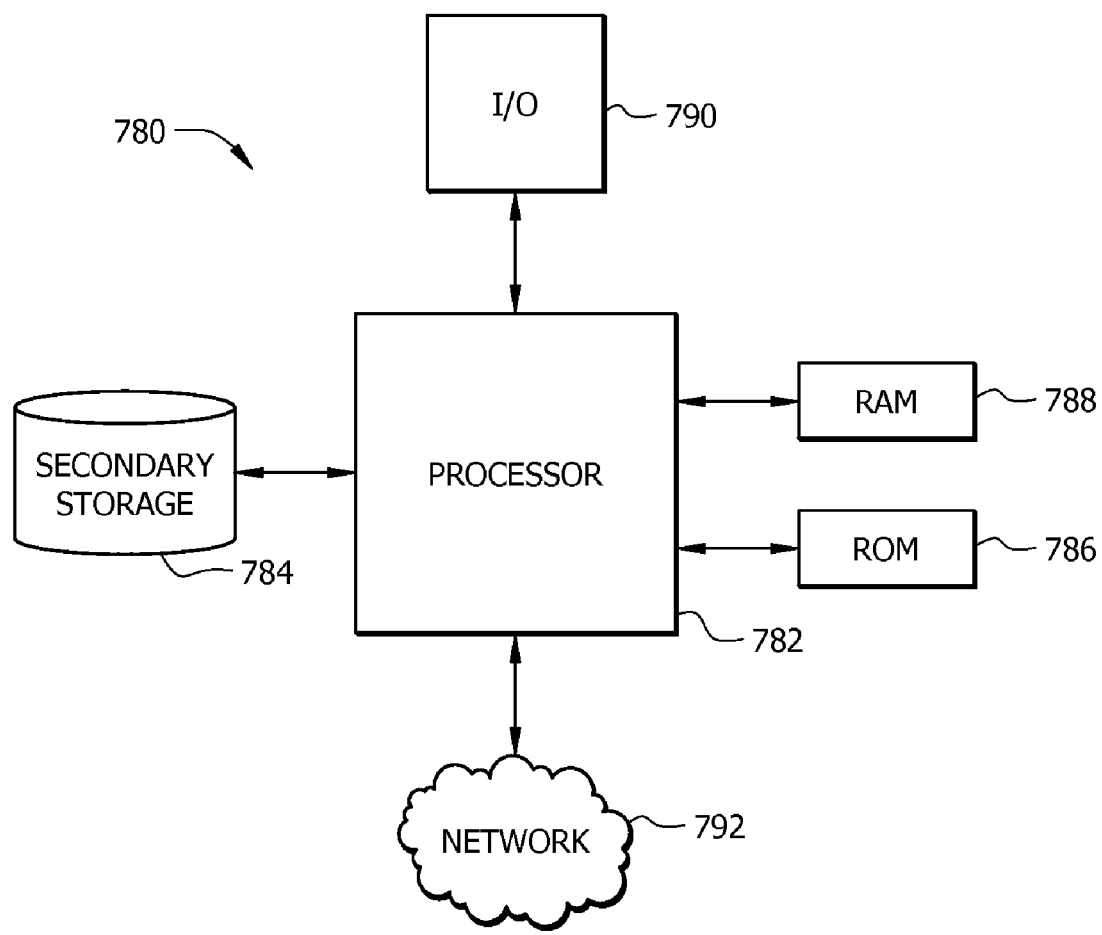
FIG. 8 illustrates an exemplary general purpose computer system suitable for implementing the several embodiments of the disclosure.

Portions of the system described above may be implemented on any general-purpose computer with sufficient processing power, memory resources, and network throughput capability to handle the necessary workload placed upon it. As with mobile devices developed for the consumer electronics market, one skilled in the art will readily appreciate the benefits of leveraging readily available general purpose computer systems by adopting them for use as mobile terminals 102-118 or the analysis station 120. FIG. 8 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as OFDMA, global system for mobile communications (GSM), and/or code division multiple access (CDMA) radio transceiver cards, and other well-known network devices. The network connectivity devices 792 may provide radio transceiver cards that promote WiMAX, 3.5 G, and/or 4 G wireless communications. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792.

The oilfield area network communication system and method may be applied to an area or region of hydrocarbon extraction. This area or region generally may cover a geographical area wherein hydrocarbon bearing formations may exist. These areas may cover hundreds of square miles. For example, in the United States, the Sabine Uplift area includes northeast Texas to northern Louisiana and encompasses the Cotton Valley and Travis Peak formations as well as other formations.

Within this area or region, multiple stimulation operations may be underway on any given day. In order to monitor and evaluate these stimulation operations and communicate with voice, data, video, and/or multi-media in real time, an oilfield area network communication system may be utilized. One skilled in the art may thus monitor and advise on treatments and any needed changes based on data collected by the oilfield area network communication system. This system will also allow a variety of communications and response options. There communications and response options include the following: intra-company communications between field and technical personnel, intra-company communications between technical personnel, oilfield service company to customer communications, and customer to customer communications, and/or any combination thereof. Customer personnel may include engineers, production foremen, and consultants. For example, a consultant may be in the field at one stimulation location and, by using this oilfield area network communication system, may be able to monitor and advise on another stimulation job within the area or region.

In one preferred example relating to stimulation operations, this oilfield area network communication system may be advantageously used for water frac operations. Water frac operations generally require longer than average job times or extended job times and do not normally require intense and continuous input. Thus an individual skilled in the art may monitor and advise on a plurality of water frac operations that are being concurrently performed over a large area.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of servicing a well bore, comprising:
   bringing into service a first mobile base transceiver station (BTS);
   bringing into position proximate the well bore a first well bore servicing vehicle; and
   bringing a plurality of mobile terminals into wireless communication with the first mobile BTS, wherein the wireless communication uses orthogonal frequency division multiple access (OFDMA), wherein at least a first one of the mobile terminals communicates with at least a second one of the mobile terminals through the first mobile BTS, wherein the first mobile terminal is associated with the first well bore servicing vehicle, wherein a third one of the mobile terminals communicates according to a first traffic priority with the first mobile BTS using a first amount of redundant encoding, wherein a fourth one of the mobile terminals communicates according to a second traffic priority with the first mobile BTS using a second amount of redundant encoding, where the first amount of redundant encoding is different from the second amount of redundant encoding, and wherein the first traffic priority is different from the second traffic priority.

2. The method of claim 1 further comprising performing a wellbore service selected from the group consisting of fracturing a reservoir via the well bore, an acidation stimulation treatment of a reservoir via the well bore, casing the well bore, cementing the well bore, and logging the well bore.

3. The method of claim 1 further comprising:
   bringing into service a second mobile BTS, wherein the second mobile BTS is coupled to the first mobile BTS; and
   monitoring the well bore servicing vehicle from a remote terminal in wireless communication with the second mobile BTS, wherein the wireless communication of the remote terminal with the second mobile BTS uses OFDMA.

4. The method of claim 3 wherein the second mobile BTS is not coupled to the first mobile BTS using a satellite communication link.

5. The method of claim 3 wherein bringing into service the first mobile BTS includes adjusting a height of a first antenna associated with the first mobile BTS and bringing into service the second mobile BTS includes adjusting a height of a second antenna associated with the second mobile BTS.

6. The method of claim 1 further comprising:
   analyzing a sensor input received by the first mobile terminal; and
   adjusting control parameters of the well bore servicing based on analyzing the sensor input.

7. The method of claim 6 wherein the sensor input is provided by the second mobile terminal, wherein the second mobile terminal is associated with a microseismic sensor, and wherein the second mobile terminal is located at least 200 meters away from the first mobile BTS.

8. The method of claim 1 wherein the mobile terminals communicate wirelessly with the first mobile BTS according to a Worldwide Interoperability for Microwave Access (WiMAX) communication protocol.

9. The method of claim 1 wherein at least some of the mobile terminals communicate wirelessly with the first mobile BTS according to one of a 3.5 generation wireless communication technology and a 4 generation wireless communication technology.

10. The method of claim 1, wherein mobile terminals communicate with the first mobile BTS using licensed frequency radio spectrum.

11. The method of claim 10, wherein the licensed frequency radio spectrum is in one of the frequency bands from about 2.5 GHz to about 2.7 GHz and from about 3.3 GHZ to about 3.9 GHz.

12. The method of claim 1, wherein at least one of the mobile terminals is a multi-band wireless device.

13. The method of claim 1, further comprising communicatively coupling a field office or a real-time operations center to the first mobile BTS.

14. The method of claim 13, further comprising wireless transmitting treatment data and equipment data to the field office or the real-time operations center.

15. The method of claim 13, further comprising transmitting wirelessly from the first mobile BTS to the field office or the real-time operations center with a data transmission rate in the range from about 1 mbps to about 12 mbps.

16. The method of claim 13, further comprising transmitting wirelessly from the first mobile BTS to the field office or the real-time operations center with a data transmission rate of about 10 mbps.

17. The method of claim 13, further comprising:
performing a wellbore service on the well bore; and
coordinating a second wellbore service on a second well bore with the wellbore service performed on the well bore, wherein the field office or the real-time operations center performs at least part of the coordinating.

18. The method of claim 17, further comprising adjusting control parameters of the second wellbore service on the second well bore based on the wellbore service performed on the well bore.

19. The method of claim 18, wherein coordinating comprises analyzing microseism data associated with the well bore to adjust the parameters of the second wellbore service.

20. The method of claim 1, wherein the first mobile BTS comprises an antenna mounted to a drilling rig derrick, where the drilling rig derrick is positioned over the well bore.

21. The method of claim 1, wherein the first mobile BTS provides a radio coverage radius of at least about 1600 meters.

22. The method of claim 1, further comprising the first BTS scheduling the wireless communication of the mobile terminals with the first BTS.

23. The method of claim 22, further comprising the first BTS associating different priorities to the mobile terminals based on the identities of the mobile terminals.

24. The method of claim 23, wherein the first BTS allocates different numbers of subcarriers to the mobile terminals based on the different priorities of the mobile terminals.

25. The method of claim 23, wherein the first BTS schedules the wireless communication of the mobile terminals with the first BTS based at least in part on the priorities of the mobile terminals.

26. The method of claim 1, further comprising communicatively coupling the first mobile BTS to a common carrier BTS, wherein the common carrier BTS is coupled to a public switched telephone network.

* * * * *